United States Patent
Terrell et al.

(10) Patent No.: US 7,447,197 B2
(45) Date of Patent: Nov. 4, 2008

(54) SYSTEM AND METHOD OF PROVIDING NETWORK NODE SERVICES

(75) Inventors: William Clinton Terrell, Thousand Oaks, CA (US); Wayland Jeong, Agoura Hills, CA (US); William W. Chow, Los Angeles, CA (US); Gordon Larimer, Agoura Hills, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 648 days.

(21) Appl. No.: 11/098,831

(22) Filed: Apr. 4, 2005

(65) Prior Publication Data

US 2005/0232285 A1     Oct. 20, 2005

Related U.S. Application Data

(63) Continuation-in-part of application No. 10/120,266, filed on Oct. 18, 2001, now Pat. No. 7,200,144.

(60) Provisional application No. 60/559,631, filed on Apr. 3, 2004.

(51) Int. Cl.
  *H04L 12/50* (2006.01)
  *H04L 12/28* (2006.01)
(52) U.S. Cl. .................. 370/360; 370/389; 370/392; 370/400
(58) Field of Classification Search ............. None
  See application file for complete search history.

(56) References Cited

U.S. PATENT DOCUMENTS

| | | |
|---|---|---|
| 5,042,029 A | 8/1991 | Hayakawa |
| 5,226,039 A | 7/1993 | Frank et al. |
| 5,239,653 A | 8/1993 | Cubero-Castan et al. |
| 5,341,483 A | 8/1994 | Frank et al. |
| 5,388,099 A | 2/1995 | Poole |
| 5,432,907 A | 7/1995 | Picazo, Jr. et al. |
| 5,434,863 A | 7/1995 | Onishi et al. |
| 5,485,455 A | 1/1996 | Dobbins et al. |
| 5,511,166 A | 4/1996 | Travaglio et al. |
| 5,550,816 A | 8/1996 | Hardwick et al. |
| 5,560,038 A | 9/1996 | Haddock |
| 5,590,285 A | 12/1996 | Krause et al. |
| 5,596,569 A | 1/1997 | Madonna et al. |
| 5,615,360 A | 3/1997 | Bezek et al. |
| 5,655,140 A | 8/1997 | Haddock |

(Continued)

OTHER PUBLICATIONS

Fibre Channel, Sep. 10, 1996. Global Engineering. pp. 20, 94, and 95.*

(Continued)

*Primary Examiner*—Hassan Kizou
*Assistant Examiner*—Brandon Renner
(74) *Attorney, Agent, or Firm*—Klein, O'Neill & Singh, LLP

(57) ABSTRACT

A network node for processing messages transmitted via a network, the node including: a first circuit providing a processor-based node path; a second circuit, coupled to the first circuit, providing a switch-based node path; and a memory storing mapping information accessible by the first and second circuits, wherein the processing of messages received by the network node is allocated between the first and second circuit based on the mapping information.

28 Claims, 12 Drawing Sheets

U.S. PATENT DOCUMENTS

| | | | |
|---|---|---|---|
| 5,790,770 A | 8/1998 | McClure et al. | |
| 5,802,278 A | 9/1998 | Isfeld et al. | |
| 5,884,040 A | 3/1999 | Chung | |
| 5,915,104 A | 6/1999 | Miller | |
| 5,940,390 A | 8/1999 | Berl et al. | |
| 5,940,597 A | 8/1999 | Chung | |
| 5,951,649 A | 9/1999 | Dobbins et al. | |
| 5,982,749 A | 11/1999 | Daniel et al. | |
| 5,983,278 A | 11/1999 | Chong et al. | |
| 5,991,299 A | 11/1999 | Radogna et al. | |
| 5,991,824 A | 11/1999 | Strand et al. | |
| 6,029,212 A | 2/2000 | Kessler et al. | |
| 6,044,402 A | 3/2000 | Jacobson et al. | |
| 6,065,087 A | 5/2000 | Keaveny et al. | |
| 6,067,301 A | 5/2000 | Aatresh | |
| 6,094,686 A | 7/2000 | Sharma | |
| 6,101,193 A | 8/2000 | Ohba | |
| 6,104,700 A | 8/2000 | Haddock et al. | |
| 6,115,751 A | 9/2000 | Tam et al. | |
| 6,118,776 A | 9/2000 | Berman | |
| 6,157,951 A | 12/2000 | Vasa | |
| 6,157,955 A | 12/2000 | Narad et al. | |
| 6,157,967 A * | 12/2000 | Horst et al. | 710/19 |
| 6,185,221 B1 | 2/2001 | Aybay | |
| 6,189,078 B1 | 2/2001 | Bauman et al. | |
| 6,260,120 B1 | 7/2001 | Blumenau et al. | |
| 6,400,730 B1 * | 6/2002 | Latif et al. | 370/466 |
| 6,424,659 B2 * | 7/2002 | Viswanadham et al. | 370/469 |
| 6,463,498 B1 * | 10/2002 | Wakeley et al. | 710/309 |
| 6,553,446 B1 | 4/2003 | Miller | |
| 6,643,269 B1 | 11/2003 | Fan et al. | |
| 6,650,646 B1 * | 11/2003 | Galway et al. | 370/397 |
| 6,674,756 B1 | 1/2004 | Rao et al. | |
| 6,683,885 B1 | 1/2004 | Sugai et al. | |
| 6,684,274 B1 * | 1/2004 | Chong, Jr. | 710/56 |
| 6,717,943 B1 | 4/2004 | Schering | |
| 6,853,638 B2 | 2/2005 | Cohen | |
| 6,874,033 B1 | 3/2005 | Sugai et al. | |
| 6,885,667 B1 | 4/2005 | Wilson | |
| 6,907,469 B1 | 6/2005 | Gallo et al. | |
| 6,957,262 B2 * | 10/2005 | Kimura et al. | 709/227 |
| 6,980,549 B1 | 12/2005 | Shabtay et al. | |
| 7,184,441 B1 * | 2/2007 | Kadambi et al. | 370/400 |
| 7,356,030 B2 * | 4/2008 | Chang et al. | 370/392 |
| 2002/0027917 A1 | 3/2002 | Sugai et al. | |
| 2002/0080752 A1 * | 6/2002 | Johansson et al. | 370/338 |
| 2002/0172195 A1 * | 11/2002 | Pekkala et al. | 370/360 |
| 2003/0002503 A1 | 1/2003 | Brewer et al. | |
| 2003/0058875 A1 * | 3/2003 | Arndt et al. | 370/412 |
| 2003/0067929 A1 | 4/2003 | Matsuzawa | |
| 2003/0204618 A1 | 10/2003 | Foster et al. | |
| 2005/0169281 A1 | 8/2005 | Ko et al. | |

OTHER PUBLICATIONS

"Office Action from USPTO dated Jul. 11, 2007 for US Appl. No. 10/284,273".

"Office Action from USPTO dated Feb. 13, 2006 for U.S. Appl. No. 10/284,655".

"Office Action from USPTO dated Feb. 15, 2007 for U.S. Appl. No. 10/284,655".

"Office Action from USPTO dated Oct. 30, 2007 for U.S. Appl. No. 10/284,655".

"Notice of Allowance from USPTO dated Feb. 7, 2008 for U.S. Appl. No. 10/284,273".

* cited by examiner

SYSTEM AND METHOD OF PROVIDING NETWORK NODE SERVICES

CROSS REFERENCE TO RELATED APPLICATIONS

This application claims priority to U.S. Patent Provisional Application Ser. No. 60/559,631, filed on Apr. 3, 2004, by William Chow, et al., the entirety of which is incorporated by reference herein. This application is also a continuation-in-part of, and claims priority to, U.S. patent application Ser. No. 10/120,266, filed on Oct. 18, 2001, by William C. Terrell, et al., the entirety of which is incorporated by reference herein

FIELD OF THE INVENTION

Embodiments of the present invention relate to network communication serving computers and peripherals including storage area networks; and to the architecture and operation of network communication ports used by several processing tasks including storage application tasks.

BACKGROUND OF THE INVENTION

There is a steady demand for increased functionality, reliability, efficiency, through put, and capacity for data communication among computers and peripherals. For instance, in a conventional storage area network (SAN) that couples computers (generally called hosts) to data storage devices (generally called peripherals), the efficiency of programs running on the computers is dramatically affected by the functionality, reliability, efficiency, through put, and capacity (also called band width) of the network.

The storage area network may include network nodes (e.g., routers) to accomplish reliable access to the storage devices by the computers. Data is transported on networks of this type conventionally by messages having source and destination addresses. A network node can modify messages that are routed through it to enable additional functionality beyond providing simple connectivity. Translation of destination addresses is desirable, for example, to implement redundancy, mirroring, archiving, copy on write (e.g., a snapshot service), and journaling. Using destination address translation, application programs performed by the computers may operate on a model of storage devices that does not have a one to one correspondence with physical storage devices on the network. In other words, the network nodes may provide an interface to the computers that supports all functions directed to a virtual storage device by directing functions to one or more physical storage devices. A map of virtual devices to physical devices is typically defined by the storage area network administrator and retained in the memory of a network node. As used herein, the term "message" is used to refer to any unit of data (e.g., frames, packets, etc.) and any data format that may be transmitted via a network between two or more devices or entities communicatively coupled to the network.

The administrator may arrange for the coupling of several ports of each storage device and several ports of each host computer to the network. Generally, increasing the number of ports a device or host can use to access the network consequently increases the reliability, efficiency, through put, and capacity of data communication between computers and peripherals coupled by the network. When services are provided in a network node, there needs to be a corresponding increase in the capability of these network nodes to support this. This is often typically handled by adding more ports within each network node and/or additional network nodes. Existing approaches to supporting network-based services have limitations inherent to the architecture. Network nodes that implement services in a server (e.g., software running on general purpose central processor unit's (CPU's)) are expensive to scale since expansion within the server complex is expensive (e.g., general purpose CPU's cost relatively more than purpose-built port processors) and limited (e.g., can't add very many CPU's, not linear scaling due to other system bottlenecks). This approach has some port-level processing capabilities, but these capabilities are limited to providing network access and does not typically include services functionality. Network nodes that implement services in a switch (e.g. microcode running in port processors) are more limited in port-level functionality and thus use a split-path approach, where certain services operations are performed in port processors while a non-overlapping set is handled by an external system. This approach cannot support existing server-based virtualization software as it typically requires software redesign to separate the functionality into two distinct systems.

FIG. 1 illustrates an example of a prior art SAN incorporating server based network nodes 50a and 50b. Servers 50a and 50b may be any type of computer, for example: a network server or a workstation. Switches 52 represent any type of interconnection network, for example FibreChannel or Ethernet, LAN, Internet, to provide connectivity between the hosts 54 through the servers 50a and 50b and to the disks 56. The hosts may be any type of computer running an application program, for example: network servers, workstations, personal computers or PDAs. The disks 56 may be any type of storage device for storing data. As mentioned above, the servers 50a and 50b represent a SAN bandwidth bottleneck that can only be alleviated by adding more servers, which is a relatively expensive proposition. FIG. 2 illustrates an example of a SAN incorporating switch based network nodes 60a and 60b in place of the servers 50a and 50b of FIG. 1. A server 62 is coupled to the switch-based nodes 60a and 60b to provide data path control functions. These data paths typically provide limited functionality and are incompatible with existing server-based virtualization software.

Thus, what is needed is a system and method that provides improvements in data communication between computers and peripherals. The value of increased functionality, reliability, efficiency, through put, and capacity includes greater return on investment for computer systems and networks including investments in hardware, software, user training, and operator training. This value also includes the value of improved results from application programs running on a host.

SUMMARY OF THE INVENTION

The invention addresses the above and other needs by providing a network node capable of providing both server-based (also referred to herein as "processor-based") node functionality as well as switch-based node functionality, and intelligently allocating or assigning tasks between the type of nodes, thereby providing a multi-layer processing approach to processing and handling messages communicated via a network.

FIG. 3 illustrates a network with, for example, two network nodes 81a and 81b, which provide services to hosts and peripherals in a network, according to one embodiment of the invention. In a further embodiment, the network nodes 81a and 81b each include a memory circuit, a plurality of switch ports, at least one processing circuit, and a plurality of host ports, each communicatively coupled to one another. As explained in further detail below, network nodes 81a and 81b each combine server-based node functionality with switch-based node functionality, intelligently allocating tasks between these two different "layers" of functionality. In one embodiment, the memory circuit stores mapping information comprising physical host and peripheral information, definitions of virtual or "logical" hosts and peripherals, and other desired information and/or control data. Each of the plurality of switch ports, each coupled to the memory and coupled to a fabric, and coupled to one or more networks, has a respective identity for communicating via their respective network. Each switch port performs services (e.g., storage and routing services) for devices coupled to the network in accordance with the mapping information.

At least one processing circuit performs a plurality of service tasks and provides each respective service task access to the host ports and/or switch ports. The service tasks provide storage and routing services, for example, in accordance with the mapping information. The host ports are coupled to at least a subset of the switch ports and associated with them to provide communication paths to forward messages from the switch ports to the at least one processor for processing and handling. This subset of switch ports in turn provides routing services for the host ports to access the other switch ports via the fabric. This allows the host ports to provide to each service task, performed or provided by the at least one processor, access to all the switch ports via the fabric. Additionally, one or more data buses allow the at least one processor to communicate with the switch ports and forward messages to the switch ports for transmission to a designated device or entity via the network.

By permitting several service tasks to cooperate with the hardware of the host ports, full use can be made of the hardware bandwidth. Service tasks performing traditional functions such as archiving, journaling, snapshot taking, and mirroring can be opened, operated, and closed without interaction or interference with other tasks. By providing numerous independent virtual interfaces, a service task operates with more than one virtual interface as desired.

By coupling and associating the host ports to a subset of the switch ports, each host port is able to access up to the maximum number of switch ports of the network node. Host ports may be configured on the fly to access more or fewer switch ports. By providing access to all switch ports, the host ports allow the service tasks to access the networks with which the respective switch ports are coupled.

When a switch port is associated with a host port, it is thereby associated to a virtual interface supported through the host port. By providing a virtual interface for each of the switch ports, service tasks can operate on the switch ports as they would with host ports connected directly to the bus of the processor circuit.

In one embodiment of the invention, a method of processing messages in network, includes: receiving a message via a network; accessing mapping information stored in a memory, the mapping information comprising control data for processing the message; determining if the message is to be processed by a first device coupled to memory and the network, based at least in part on the control data; if so, processing the message with the first device; otherwise, forwarding the message to a second device for processing.

In another embodiment, a method of providing service tasks for devices communicating via a network, includes the following steps: receiving a message at a first device via the network; reading overhead data contained in the message indicative of a requested service task; accessing mapping information from a memory, the mapping information comprising service task information that identifies the requested service task as one of a plurality of service task types; performing the requested service task with a first device, coupled to the memory, if the requested service task corresponds to a first service task type; and performing the requested service task with a second device, coupled to the memory, if the requested service task corresponds to a second service task type.

In a further embodiment, a method of handling network messages, includes: receiving a message via network; reading routing data contained in the message, wherein the routing data comprises the identity of a network entity designated to receive the message; accessing mapping information stored in a memory, the mapping information comprising information correlating a plurality of virtual network entities with a plurality of physical network entities and further control data for processing the message; determining if the message is to be routed by a first device or a second device, based at least in part on the control data; determining whether the designated network entity is a virtual network entity or a physical network entity based on the mapping information; if the designated network entity is a first physical network entity, routing the message to the first physical network entity; and if the designated network entity is a virtual network entity, identifying at least one second physical network entity corresponding to the virtual network entity and, thereafter, routing the message to the at least one second physical entity.

In yet another embodiment, a method of processing a message, includes: receiving the message by a switch port; parsing the message to extract a routing data, the routing data comprising a network address of an initiating device, a network address of a virtual target port and a logical unit number of a virtual peripheral; accessing mapping information stored in a memory to determine if the message can be processed by the switch port; if it is determined that the switch port cannot process the message, then reformatting the routing data to provide an address for an intermediate host port as an intermediate destination address; forwarding the message to the intermediate host port; reformatting the routing data a second time to indicate an address corresponding to the virtual target port as the final destination address; and forwarding the message to a processor for processing.

In another embodiment, the invention provides a network node for processing messages transmitted via a network, the node including: a first circuit providing a processor-based node path; a second circuit, coupled to the first circuit, providing a switch-based node path; and a memory storing mapping information accessible by the first and second circuits, wherein the processing of messages received by the network node is allocated between the first and second circuit based on the mapping information.

In a further embodiment, a network node for processing messages transmitted in a network, includes: a plurality of switch ports, each coupled to the network for receiving and sending messages via the network; at least one intermediate host port, coupled to the plurality of switch ports; at least one processor, coupled to the at least one intermediate host port and to the plurality of switch ports; and a memory, coupled to the plurality of switch ports and the at least one processor, the memory containing mapping information for controlling how messages are handled by at least one of the plurality of switch ports and the at least one processor.

DETAILED DESCRIPTION OF THE PREFERRED EMBODIMENTS

Various preferred embodiments of the invention are described in detail below with reference to the figures, wherein like elements are referenced with like numerals throughout.

A network, according to various aspects of the present invention, provides services to hosts and peripherals communicating via the network. According to conventional communication protocols, a host and peripheral differ at least in that the host generally initiates communication with a peripheral.

For a communication between a host and a peripheral, network-based services includes any service performed by a node in a network between the host and the peripheral. A network-based storage service may perform as an additional host operating in place of the host (i.e. the node appears to a peripheral as an emulated host); or, an additional peripheral operating in place of the peripheral (i.e., the node appears to a host as an emulated peripheral). Storage services may provide, for example, improved reliability (e.g., redundant operations performed by the storage service such as mirroring or other forms of data replication), improved throughput (e.g., alternate data sources, sinks, and/or paths in a network), improved network monitoring and diagnostics (e.g., taking snapshots of activity or of storage media), improved availability (e.g., failover), virtualization (e.g., virtual storage devices defined over portions of one or more physical storage devices), and load balancing (e.g., providing copies of media for multiple access, synchronizing copies of media, setting up journaling to be accomplished off peak time, or updating archives whenever traffic is relatively low), to name a few applications related to storage area networks.

Figure 4:
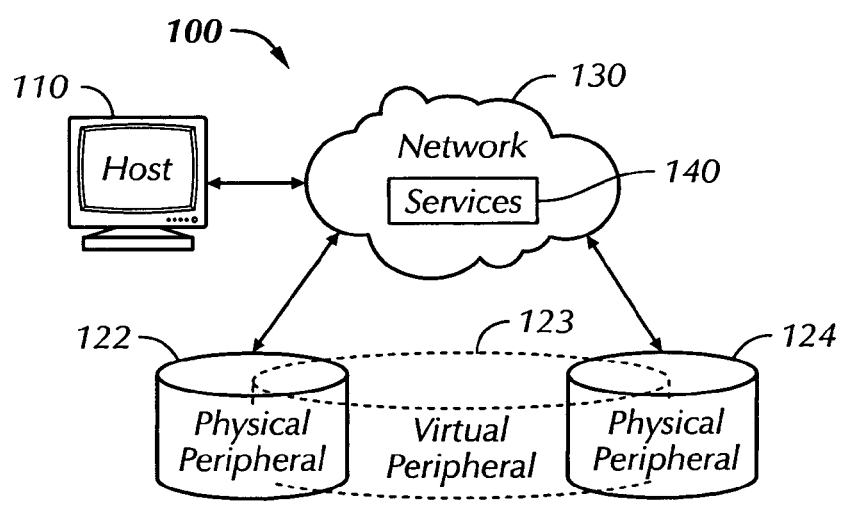
FIG. 4 is a block diagram of a network having a host computer and two physical peripherals, according to one embodiment of the present invention.

Services may be implemented in the network between conventional hosts and conventional peripherals. For example system 100 of FIG. 4 includes conventional host 110, conventional peripherals 122 and 124, and network 130. Network 130 includes at least one link to each device using the network (i.e., a link to host 110, and to each peripheral 122, 124). Devices using the network are generally called members of the network. Data communication via network 130 includes messages comprising frames, each frame including a header and a payload and conveyed according to a conventional communication protocol and a hardware signaling protocol.

Network 130 further includes one or a cooperating group of network nodes (not shown). According to various aspects of the present invention, network 130 provides services 140, as discussed above, performed by any one or cooperating group of network nodes. A network node may operate as a repeater, router, protocol translator, bridge, hub, and/or switch. A network node may include any conventional repeater, router, protocol translator, bridge, hub, and/or switch working individually or in cooperation with other repeaters, routers, protocol translators, bridges, hubs, and/or switches. A network node may further include one or typically several processors associated with the network node (e.g., an administrative platform for the network node). According to various aspects of the present invention, these processors may provide services.

For example, when system 100 includes functions of the type known as a storage area network (SAN), peripherals 122 and 124 may include functions of conventional disk drive arrays. Services 140 may include any network-based service as discussed above and defined by a configuration of services 140. For instance, when services 140 includes storage device virtualization, application programs performed on host 110 may access (e.g., read or write) a segment referring to a virtual storage address (e.g., a drive, surface, cylinder, and sector) on virtual peripheral 123 without designating a particular physical storage address of physical peripheral 122 or 124. An administrator may (with conventional precautions for integrity of the data and application program states) redefine the virtual to physical correspondence by altering the mapping data to change the configuration of services 140. In another instance, services 140 may include mirroring. On each write access by an application program to a virtual peripheral 123, services 140 may determine one or more suitable physical storage addresses (e.g., involving both peripherals 122 and 124) to be used for a mirrored write access (e.g., write multiple copies of the data being written by the application program), complete the requested write access to peripherals 122 and 124, detect and report any abnormal conditions in the original write access, and when finished, complete the original write request by the host.

For improved reliability and availability, an archival copy of data may be maintained on a different virtual peripheral (i.e. logical storage device) or a different physical peripheral (i.e. physical storage device). According to a predefined configuration of services 140 in one embodiment, a storage service may perform the following operations. Write access to virtual peripheral 123 is detected and archived by initially setting all regions as read-only. Write access to a portion of virtual peripheral 123 may be arranged by temporarily blocking (e.g., queuing) selected write requests to virtual peripheral 123. The storage service (operating as an intermediate host, provided by a network node) initiates a read operation for data to be archived and initiates a write operation to a suitable archive storage address (e.g., virtual or physical involving peripheral 124). The node providing storage service 140 monitors, takes suitable action on error conditions that may arise, and completes both the read and write operations to accomplish archiving. When the archival process is accomplished, the storage service may enable write access and return the portion of peripheral 122 back into regular service facilitating emptying of queues of temporarily blocked write operations.

As discussed above, services 140 may be hosted by a platform otherwise operating as a conventional network node. For example, node 200 of FIG. 5, according to one embodiment of the present invention, includes a processing circuit 202 for performing services in addition to performing conventional functions of a router and gateway. Node 200 further includes a group of switch ports 206 (e.g., 20 of which 4 are shown), a group of intermediate host ports 204 (e.g., 4 of which 1 is shown), and a fabric 232. For purposes of illustrating various aspects of the present invention, a virtual peripheral 123 is shown as comprising portions of physical peripherals 122 and 124. Node 200 may further perform all functions described in U.S. patent application Ser. No. 10/120,266 referred to above, the entirety of which is incorporated by reference herein. Also in one embodiment, internal switch port 222 and external switch ports 206 are similar or identical to the port logic circuits 1186 and 1188 described in U.S. patent application Ser. No. 10/120,266.

Figure 5:
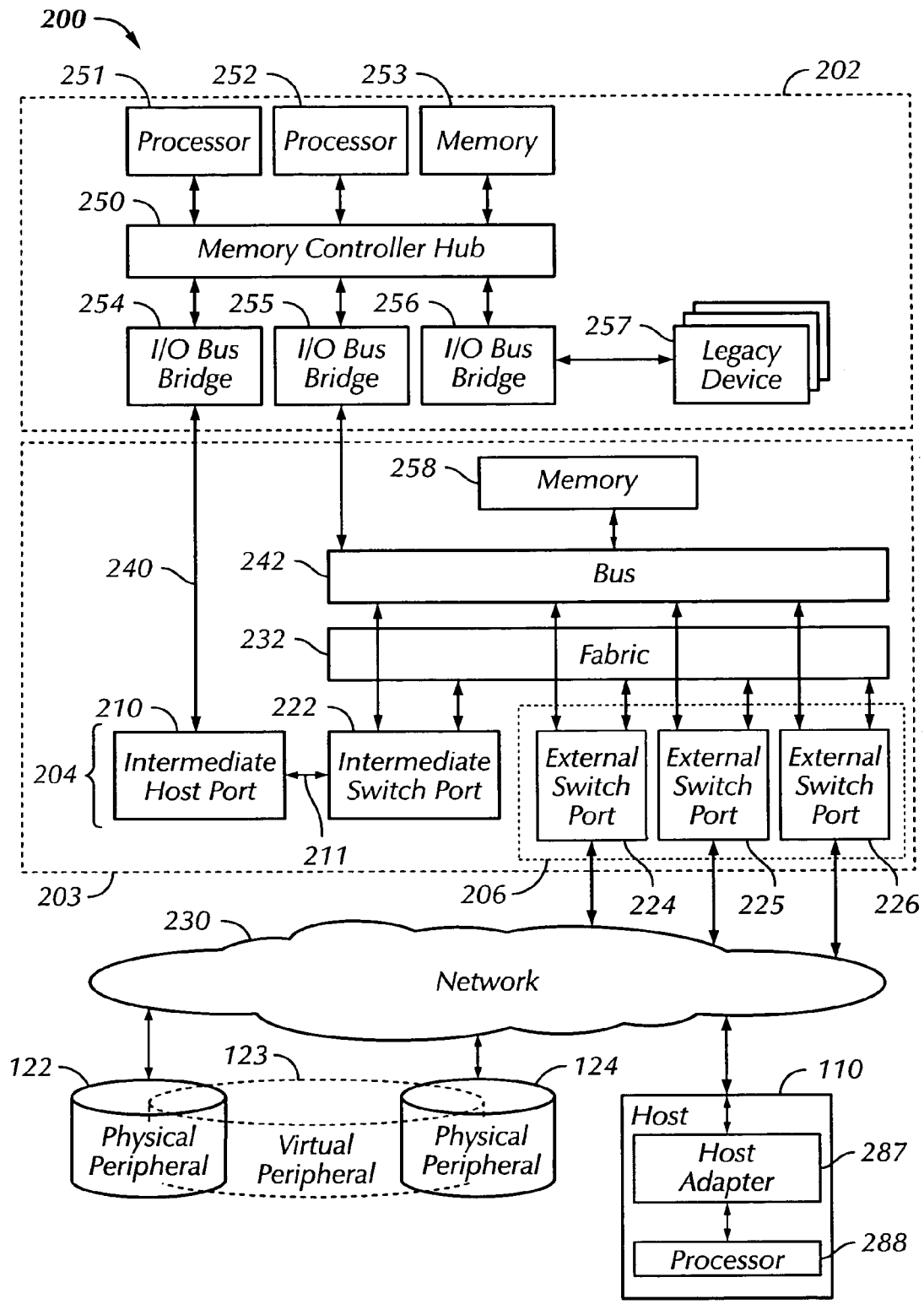
FIG. 5 illustrates a block diagram of a network node, in accordance with one embodiment of the invention.

Network 230 couples external switch ports 224-226 of node 200 to host 110 and peripherals 122 and 124. Network 230 may be any conventional network. In FIG. 5, a network 230 (of any conventional complexity) provides the links of network 130, discussed with reference to FIG. 4. In one implementation, network 230 links devices to external switch ports 224-226 via exemplary logical point-to-point connections as described in Table 1; and, fabric 232 links switch ports 222, and 224-226 to one another. In the discussion that follows, each host, peripheral, and external switch port provides one interface to network 230.

TABLE 1

| Device | External Switch Port |
|---|---|
| Host 110 | 224 |
| Peripheral 122 | 225 |
| Peripheral 124 | 226 |

In alternate embodiments, multiple interfaces to network 230 may be used at any host 110, peripheral (e.g., 122), or node 200 for increased communication capacity and/or reliability. For example, external switch port 226 may be implemented with three external switch ports (226a, 226b, and 226c, not shown) in place of external switch port 226 for higher throughput to network 230 serving peripheral 124; and, peripheral 124 may have one or more interfaces to network 230 regardless of the number of external switch ports for peripheral 124 at node 200. According to various aspects of the present invention, each of these three external switch ports (226a, 226b, 226c) provides for communication between a node processor (e.g., processor circuit 202) and peripheral 124 may use a common intermediate host port 204. The intermediate port functions supporting three external switch ports (226a, 226b, 226c) may be implemented with one intermediate host port 210 coupled to one intermediate switch port 222. For increased throughput and/or reliability several intermediate host ports 210 comprising a group of intermediate host ports 204, in conjunction with corresponding intermediate switch ports, may service these three external switch ports (226a, 226b, 226c).

As shown in FIG. 5, one intermediate host port 210 may serve multiple external switch ports 224-226. For example, intermediate host port 210 may be used to present an HBA interface capability to service tasks running on processor circuit 202 for each transport-addressable endpoint on external switch ports 224-226 for communication with one or more hosts and/or peripherals 122, 124. In another implementation, more than one intermediate host port (e.g., 210a, 210b, 210c not shown) may communicate via one external switch port (e.g., 226). Each external switch port 224-226 may expose one or more transport-addressable endpoints in the network, and intermediate host port 210 may be used to present an HBA interface capability for every transport-addressable data transport endpoint exposed by external switch ports. In one embodiment, intermediate host port 210 comprises a conventional host bus adapter (HBA).

The utilization of each intermediate host port 210 of the set 204 and each external switch port of set 224-226 may be defined by a map in memory 258 and/or memory 253, as discussed below. This map provides the routing information necessary for external switch ports 224-226 to exchange messages with service tasks running on processor circuit 202 via intermediate host ports 204. The map may define one-to-one, one-to-many, many-to-one, and/or many-to-many relationships between intermediate host ports 204 and external switch ports 224-226.

A processing circuit includes any circuit that executes stored programs including firmware and/or software. A conventional processing circuit includes one or more microprocessors, memory coupled to the processor(s) by a bus, and various peripherals for mass storage, operator interface, and control of platform specific circuits. For example, processing circuit 202 includes processors 251 and 252; memory 253; hub 250; I/O bus bridges 254, 255, and 256; and legacy devices 257. In one implementation, all of the foregoing components are members of a chip set such as the E7500 chip set marketed by Intel, Inc. In an alternate embodiment, processing circuit 202 may use a "HyperTransport" architecture having a chip set of the type marketed by Advanced Micro Devices. Processing circuit 202 is coupled by bus 240 to intermediate host ports 210. Processing circuit 202 is also coupled to memory 258 and switch ports 206 by bus 242. In an alternate implementation, bus 242 further includes an independent path between memory 258 and each external switch port to avoid latencies in each port.

In one embodiment of the invention, Hub 250 provides communication among processors 251 and 252, memory 253, and I/O bridges 254-256. Each I/O bridge may serve as a bus master from time to time, for example, to access memory 253 via hub 250. In an alternative embodiment using a different chip set, the processor circuit 202 may interconnect with other system components, particularly intermediate host ports 210 and switch ports 206, using a switched architecture (e.g. HyperTransport, PCI Express, etc.).

Figure 2:
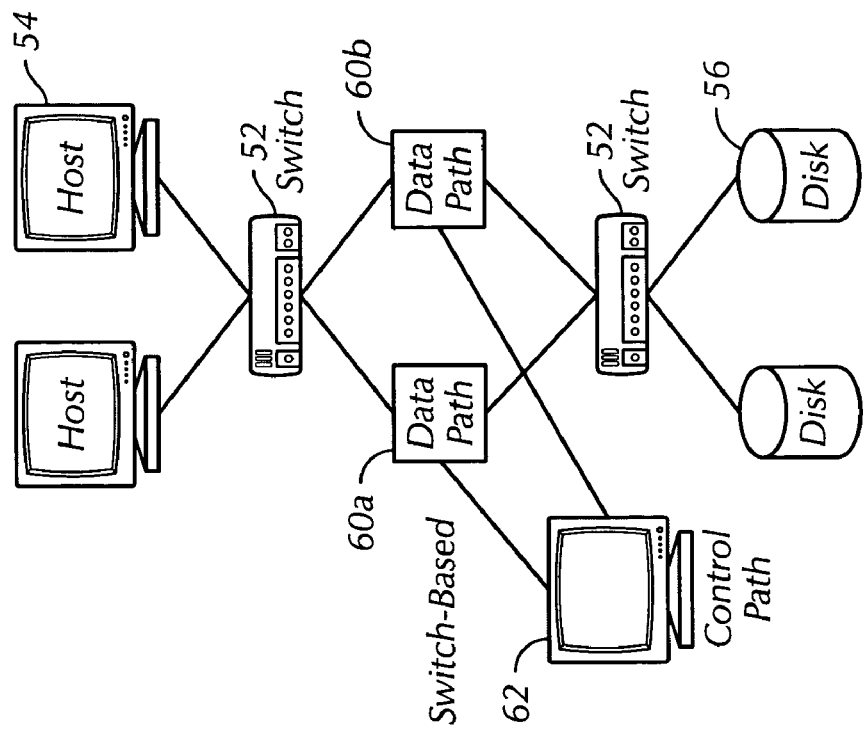
FIG. 2 is an illustrative example of two switch-based systems providing services in a SAN.
Figure 1:
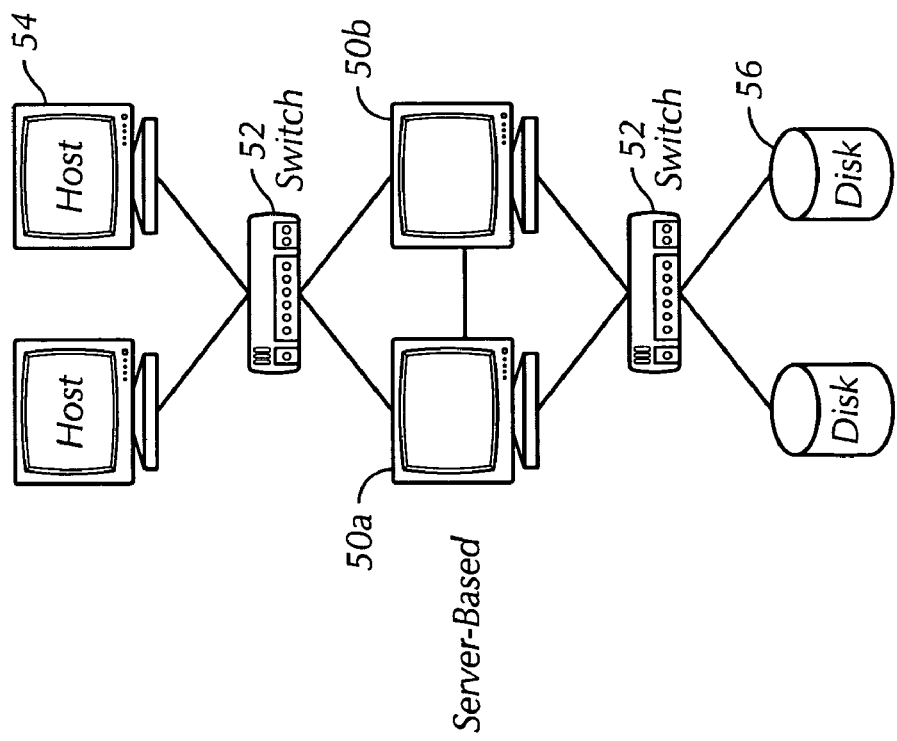
FIG. 1 is an illustrative example of two server-based systems providing services in a storage area network (SAN).

A memory includes any device that stores data for access by a processor. Any combination of semiconductor memory, optical, and/or magnetic memory technologies may be used. Memory 253 and 258 may include volatile and/or nonvolatile memory, solid state and/or disk memory. Memory 253 and memory 258 may provide instructions, data, and/or workspace for processes performed by either processor 251, 252, switch ports 206, and intermediate host ports 210. Access by processors 251 and 252 to memory 253 may be optimized over access by switch ports. Access by switch ports 222-226 to memory 258 may be optimized over access by processors 251 and 252. Also, processes performed by a switch port may refer to memory internal to that switch port for a majority of instructions, data, and workspace. Although switch ports 222-226 are shown in FIG. 2 as accessing memory 258 through bus 242 and as accessing memory 257 through bus 242 I/O bus bridge 255, and memory controller hub 250, some embodiments of the invention may include alternate and/or additional access paths as readily apparent to one of ordinary skill in the art. In one embodiment, memory 258 may include a memory controller and provide access to stored memory by conventional content addressable techniques and/or by conventional random access techniques, and memory 253 is a random access memory (RAM). In a further embodiment, memories 253 and/or 258 store mapping information that is utilized to perform the services and functions described herein. This mapping information is described in further detail below, and can comprise the exemplary data, or subsets thereof, contained in Tables 1-4 below.

In one embodiment, I/O bridge 254 provides a conventional PCI bus 240 linking intermediate host ports 204 to all resources available via hub 250. For example, an intermediate host port 210 may access memory 253 for read/write data (e.g., configuration data, commands from processors 251-252, routing tables), or for download of instructions to be performed by a processor integral to intermediate host port 204. Processors 251-252 may access intermediate host ports 210 via hub 250 and bridge 254 for data communication through each intermediate host port 210 and for control of each intermediate host port 210. For instance, processors 251-252 have read/write access to control and status registers, command queues, and data buffers of intermediate host ports 204.

In one embodiment, I/O bridge 255 provides a conventional PCI bus 242 linking switch ports 206 to all resources available via hub 250. For example, switch port 224 may access memory 253 for read/write data (e.g., configuration data, commands from processors 251-252, routing tables), or for download of instructions to be performed by a processor integral to external switch port 224. Processors 251-252 may access one or more of the switch ports 206 via hub 250 and bridge 255 for data communication through the switch port and for control of the switch port. For instance, processors 251-252 have read/write access to control and status registers, command queues, and data buffers of external switch port 224. Bus 242 also provides access to storage in memory 258 or switch ports 222 and 206 for instructions and/or data (e.g., a map or maps and routing information) used individually or in common among external switch ports 206. In an alternate implementation illustrated in FIG. 2b, bridge 255 and 242 may be omitted, and any necessary communication (e.g. control, configuration, management) between processor 251-252 and switch ports 206 can be handled thru alternate interfaces (e.g. thru networks 230 or 231, or I/O devices attached thru bridge 256).

In one embodiment, I/O bridge 256 provides a conventional I/O controller hub 244 linking other devices (e.g., legacy devices 257) to all resources available via hub 250, including for example, conventional IDE disk drives (e.g., for software for processors 251-252), flash memories (e.g., for initial configurations and/or firmware for processors and ports), a user console interface (e.g., for use by a network administrator for controlling node 200), and local area network interfaces (e.g., for communication with other networked systems).

A fabric 232 (or "switching fabric") provides communication among all devices coupled to the fabric. In one embodiment of a fabric 232, any device on the fabric may at any suitable time broadcast a message (by conventional physical bus, star or ring signaling) to all devices coupled to the fabric and the device to which the message is addressed takes any suitable action on receipt of the message (e.g., enqueueing the payload of the message for transfer off the fabric onto network 230, onto bus 242 or onto bus 240). In another embodiment, messages on the fabric may be directly routed to the destination via a switching element that joins all devices on the fabric. Addresses used for messages on the fabric may be either internal addresses that are private to the devices on the fabric or external switch port addresses that are visible to other nodes connected to network 230. Fabric 232 provides connectivity between switch ports 206 and may be implemented as a backplane. Any conventional message protocol may be used for communication via fabric 232.

In one embodiment, switch ports 222 and 224-226 send and receive messages via the fabric 232, and send and receive control information via bus 242. External switch ports 224-226 may also send and receive messages via network 230 (e.g., on a link as in Table 1), and an intermediate switch port 222 also sends/receives messages via network 211. For example, each external switch port 224-226 includes a network interface coupled to network 230, a control interface coupled to processing circuit 202 via bus 242 and a fabric interface coupled to fabric 232. Similarly, each intermediate switch port 222 includes a network interface coupled to network 211, a control interface coupled to processing circuit 202 via bus 242 and a fabric interface coupled to fabric 232. A switch port provides message parsing, address translation, and message formatting in support of the aforementioned message communications (e.g., supporting different protocols in each communication medium). In an embodiment, switch ports 222, and 224-226 are similar or identical to port logic circuits 1186 and 1188 described in co-pending application Ser. No. 10/120/266. Each switch port has a transport address for sending/receiving messages in each communication medium and may have integral memory. A switch port may be implemented in any combination of hardware, firmware, and software.

In one embodiment, each message received from network 230 (e.g., a SCSI protocol message) is modified by an external switch port (e.g. 224) and forwarded to a destination switch port in accordance with routing information stored in its integral memory (not shown), in memory 253, and/or in memory 258. The destination may be another external switch port (e.g., 226) or an intermediate switch port (e.g., 210 or 222). If a message is received from network 230 for which no routing information is available (e.g. from integral memory, memory 258, or memory 253), the switch port (e.g., 224) may forward the message to processes performed by processors 251 and/or 252 via I/O bus bridge 254 and/or 255 (e.g., by storing the message in memory 253 or 258, either written directly by switch port 224 or by forwarding it to intermediate host port 210 from intermediate switch 222 via network 211). [For example, if a message is received by switch port 226 specifying an access request to a virtual network entity, in one embodiment, the switch port 226 accesses the mapping information in memories 258 and/or 253 to identify at least one physical network entity that corresponds to the virtual entity for which access has been requested. If the mapping information does not contain the necessary correlation information, or if the requested access is not authorized, the switch port 226 forwards the message to intermediate switch 222 for ultimate handling and processing by one of the processors 251 or 252. The processes performed by processors 251 or 252, which operate at or at least interface with a higher application layer, is better able to process the message and can also update the mapping information to designate one or more physical devices as corresponding to the requested virtual entity. These processes may support dynamically updating virtual to physical mapping information and can specify any arbitrary rule or criteria that causes the switch ports 206 to forward messages for processing by the processors 251 or 252.

Conversely, each message received from intermediate host port 210 is converted by a intermediate switch port (e.g. 222)

and forwarded to the external switch port in accordance with routing information stored in integral memory (not shown), in memory 253, and/or in memory 258. Messages of particular types are identified by message parsing and particular actions are taken based on message type. For example, network control messages (e.g., Fibre Channel loop initialization primitives or link services) and application messages (e.g., SCSI FCP information units) may be passed to intermediate host ports 204 (via fabric 232 and intermediate switch port 222) or passed more directly to processors 251-252 via bus 242 and memory 253 and/or 258. As used herein, the term "processing a message" refers generally to routing or sending the message to its intended destination and performing any other desired actions to complete a requested task, service, data exchange, or transaction (collectively referred to herein as "service tasks") for one more network entities (e.g., hosts and peripherals) communicatively coupled to the network.

An intermediate host port provides processing for lower level protocols supported by network 211. In one embodiment, an intermediate host port 210 provides processing circuit 202 with received message payloads (e.g., from host 110 or a peripheral, forwarded from external switch ports 224-226 thru intermediate switch port 222 via network 211) and message types as determined by the intermediate host port in a manner that avoids or reduces the processing burden for the lower level protocols used to convey the messages. Conversely, processing circuit 202 may provide message payloads and message types to an intermediate host port and the intermediate host port will perform the necessary acts according to lower level protocols to ensure message delivery (e.g., thru intermediate switch port 222 and then out external switch ports 224-226 to host 110 or a peripheral). An intermediate host port may also conduct session level communication (e.g. via network 230 thru switch ports 206) to insulate processor circuit 202 from the particulars and the workload of the lower level protocol that ensure accurate and timely delivery of complete messages on network 230 (e.g., acknowledgements, requests for retransmissions, and re-ordering packets received out of order). An intermediate host port may be implemented in any combination of hardware, firmware, and software. In one embodiment, intermediate host port 210 comprises an Agilent DX2 HBA and associated driver circuitry and logic.

In a further implementation, one or more intermediate host ports 210 and zero or more switch ports 206 are formed on a first circuit card 203 having a bus interface (e.g., 240 and/or 242) to communicate with the host processor circuit card 202 (e.g., processor, memory, and I/O bridge). Bus 242 may be omitted in an alternate implementation by provisioning bus 240 to provide the additional, required functionality. In one embodiment, busses 240 and/or 242 comprise PCI data busses. The circuit card 203 may be installed in a separate workstation (e.g., a host) or a server (e.g., a network hub, router, or switch) apart from processor circuit 202 but communicatively coupled to the processor circuit 202 via busses 240 and/or 242 to improve communication effectiveness.

For example, in FIG. 5 an intermediate switch port 222 is coupled to an intermediate host port 210 via a network link 211. Intermediate switch port 222 is similar in structure and function to any external switch port 224-226 discussed above with reference to switch ports 206 except that the network interface of intermediate switch port 222 is coupled by link 211 to intermediate host port 210 instead of to network 230. Intermediate host port 210 includes a network interface coupled to link 211 and a control interface coupled to processing circuit 202 via bus 240.

Figure 6:
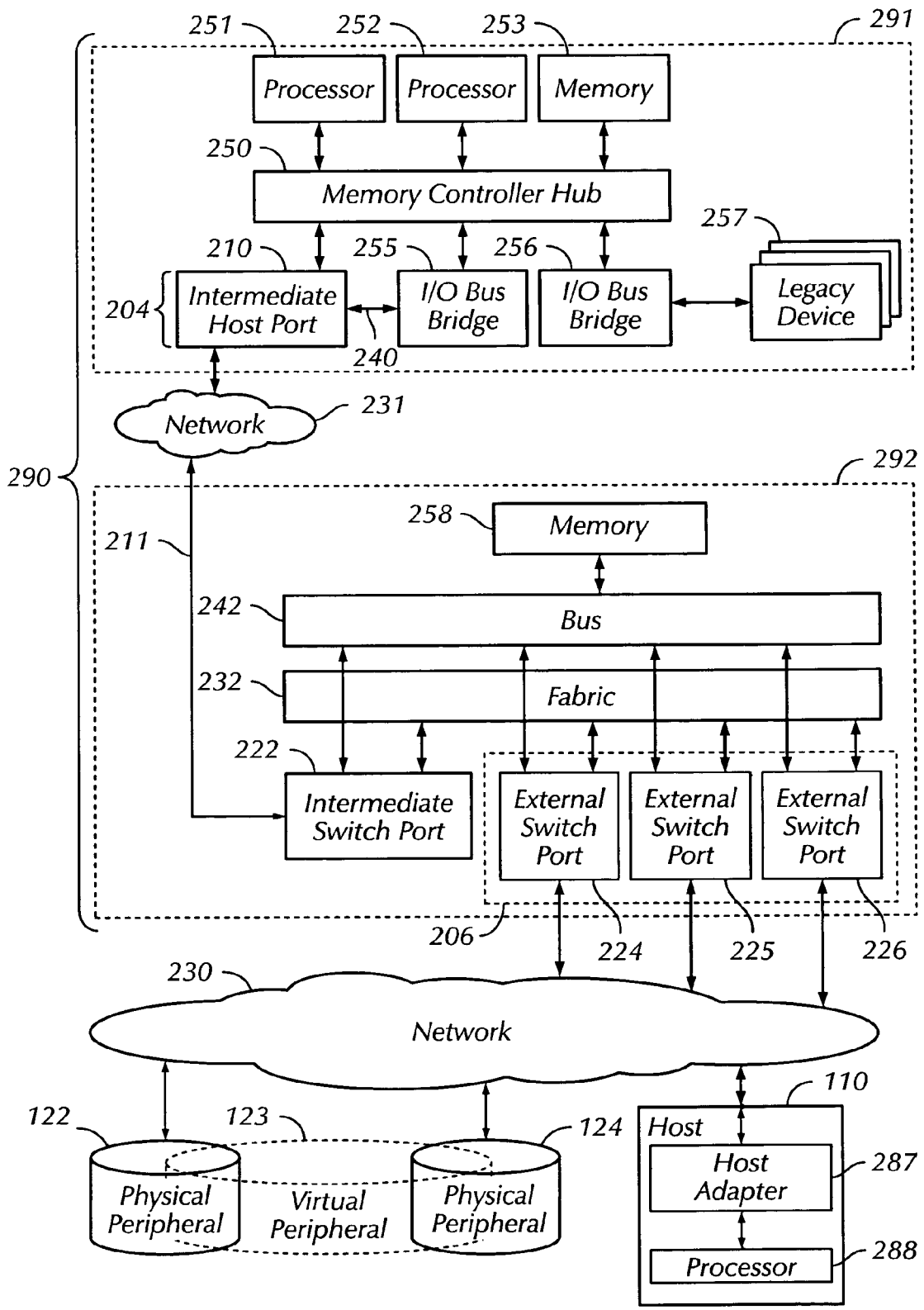
FIG. 6 illustrates a block diagram of two sub-circuits of a network node separated by a network, in accordance with another embodiment of the invention.

In one embodiment, in FIG. 6, the intermediate host ports 204 and switch ports 206 may be part of two subsystems separated by a conventional link or network 231. For example, node 290 of FIG. 2b includes processing subsystem 291, switching subsystem 292, and other numbered functional blocks corresponding to similarly numbered functional blocks discussed above. In this embodiment, network 231 couples one or more intermediate host ports 210 to one or more intermediate switch ports 222. Network 231 may include any conventional network to facilitate many-to-one, one-to-many, or many-to-many relationships between intermediate host ports and intermediate switch ports for increased communication capacity, load sharing, redundancy, convenience, and efficiency. When intermediate host port 210 and intermediate switch port 222 conform to industry standard interfaces, link 211 may be implemented without custom or proprietary technology (e.g. Fibre Channel protocol). In one implementation, subsystems 291 and 292 are packaged in the same enclosure to share common functions such as power supply circuitry and front panel displays. In another implementation, subsystems 291 and 292 are packaged in separate systems and may be remotely separated, for instance, located in different buildings of a campus.

Each switch port of switching subsystem 292 may have a configuration (e.g. for routing messages via link 211) that includes a static portion and/or a portion set either by messages received via network 230, bus 242 and/or link 211. The configuration data may be stored in memory 258, and/or internally stored in each switch port.

An intermediate host port supporting SCSI and lower level protocols may be implemented with a conventional host bus adapter (HBA) (e.g., a model DX2 as marketed by Agilent). Consequently, processing circuit 202, in cooperation with intermediate host ports 204, conducts communication via network 230 as one or more hosts as may be needed to accomplish services as discussed above. As an example of peripheral virtualization in reference to FIG. 5, host 110, via its processor 288 and conventional host bus adapter 287 may access virtual disk 123 on network node 200. Consequently, external switch port 224 (coupled to host 110 and serving as a target of host 110) intercepts messages directed to virtual disk 123 and may forward these messages to intermediate host port 210 via intermediate switch port 222. Intermediate host port 210 notifies processing circuit 202, cooperates with service tasks running on processing circuit 202 to intercede as a virtual host to a physical peripheral (e.g., any suitable portions of peripherals 122-124), conducts suitable accesses to peripheral 122 and/or 124 via external switch ports 206 (by way of intermediate host port 210, network link 211, and intermediate switch port 222), and responds to host 110 as if host 110 were in direct communication with a nonvirtual peripheral (e.g., physical peripheral 122).

According to various aspects of the present invention, any external switch port in communication with an intermediate host port may express to the network the functions of one or more virtual network ports (e.g. Fibre Channel N_port). These network ports are virtual in that they may or may not be equal to the number of interfaces on external switch ports 224-226 that connected to network 230 (e.g. each external switch port may provide access to one or more network ports, each of which are addressable by external network nodes thru network 230). For example, external switch port 224 may appear to host 110 as one or more target ports (e.g., each hosting one or more virtual disk 123) by any conventional means (e.g. acquiring one or more network addresses from an Fibre Channel network or loop). For increased capability, intermediate host ports 204 may utilize additional external switch ports (e.g., 225, and 226) that are coupled to the same fabric (e.g., 232). Because intermediate host port 204 is effectively coupled to fabric 232 via one or more intermediate switch ports 222, one intermediate host port 204 may utilize any number of external switch ports 206.

According to various aspects of the present invention, services performed by processing circuit 202 are performed by a plurality of service tasks, each task cooperating with one or more of the virtual network ports hosted by network node 200. Two levels of virtualization provide the service task with ease of programming and high message processing capacity. At a first level, one intermediate host port cooperates with an interface driver that maintains an instance of an application program interface (API) (or maintains a separate interface) for each service task. Each service task may independently operate its own interface instances to the virtual network ports via the API. Second, one intermediate host port (e.g., as in the first level of virtualization) is coupled to an intermediate switch port for access to any number of external switch ports. In other words, a service task may in fact be serviced by one intermediate host port 210 and several external switch ports 206.

Intermediate host ports 204 and switch ports 206 have identities for communicating via bus 242 (same or different) identities for communicating via fabric 232, and (same or different) identities for communicating via network 230 (i.e. one for each virtual network port hosted by network node 200). The identity of the interface provided to a service task for a virtual network port may be different from any of these identities. Each intermediate host port identity is generally associated with one or more external switch port identities, and each external switch port identity is generally associated with one or more virtual network port identities. More than one intermediate host port may in fact be using the same external switch port (e.g., for redundancy, hot sparing, and fail over of intermediate host ports). The service task may be unaware of the intermediate host port and switch port identities in use.

A port, as used herein, transfers data in connection with a service (e.g., an application program, handling of an I/O request, routing of a message, etc.) and/or transfers data to or from a another port or other network device. A port performs one or more signaling protocol functions and/or message protocol functions. In one embodiment, a port may be implemented as an engine having any combination of processors and/or circuits. Since signaling and message protocols may be complex, the entire path from an application program to a network is typically served by several ports (or engines) in series, each port responsible for a subset of the functions of the signaling and message protocols. In one implementation, the data path from an application program to a network is served by circuits and processors that execute software. The software includes objects that communicate with each other via interfaces between the objects. An object generally maintains encapsulated data that is accessible across an interface by interprocess communication (e.g., a subroutine call, remote procedure call) as opposed to read/write access (shared memory, shared queues, semaphore, mutex, shared files). A first object generally provides a copy of its encapsulated data to another object in a return from an interprocess communication. When delays associated with interprocess communication are unsuitable, an initial provision of data to a trusted object may include a handle or address that permits subsequent access by the trusted object to the formerly encapsulated data.

Figure 7:
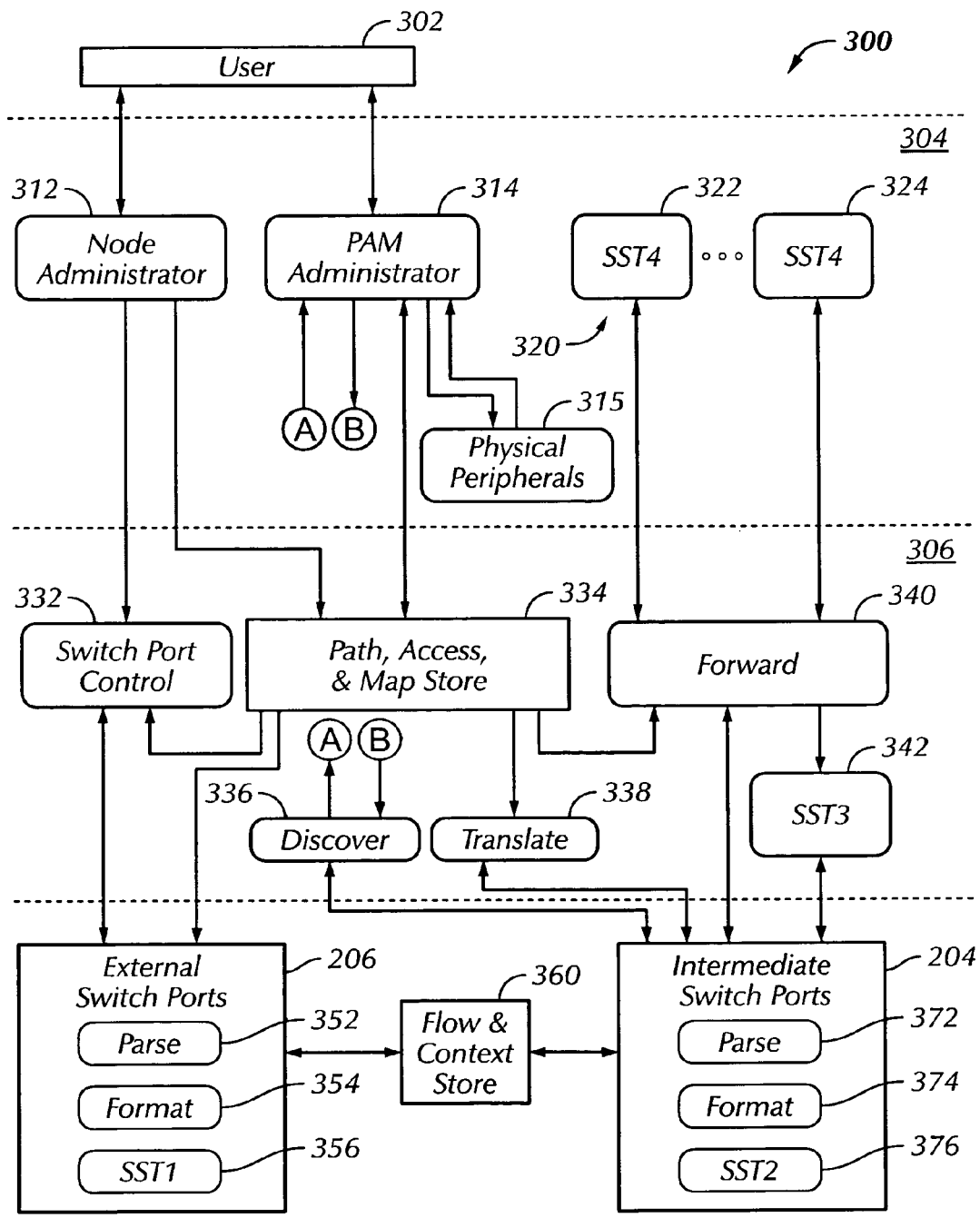
FIG. 7 is a diagram depicting layers and interrelations of services for performing service tasks, in accordance with one embodiment of the invention.

A process for providing services and for providing virtual network ports, according to various aspects of the present invention, includes a mapping of virtual network port identities to physical port identities (i.e. intermediate host ports 204 and switch ports 206). For example, process 300 of FIG. 7, includes an application program layer 304 and a driver layer 306 that stand between a user 302 and other processors including switch ports 206 and intermediate host ports 204. The driver layer and application program layer have access to the PAM store 334 for information describing the paths, access criteria, and maps (PAM). An operating system (e.g., Linux) (not shown) facilitates application program startup and termination, and provides to each application program in layer 304 application program interfaces (APIs) as implemented by drivers in driver layer 306. The operating system performs processes in application program layer 304 in a conventional application program mode and performs processes in device driver layer 306 in a conventional privileged mode (e.g., a kernel mode). In an alternative implementation, layer 304 and 306 may be performed in the same mode (e.g. both can be implemented as kernel-mode drivers or both can be provided in the same, or in different user-mode processes). One or more individual processes may make up process 300 and may operate at any time sufficient data is available. Data passed between processes may be passed using any conventional mechanism including register I/O reads and writes, queues, mailboxes, and doorbells. Application program layer 304 may have access to PAM 334 through the API, for example, via calls to suitable processes in device driver layer 306.

An external switch port performs parsing and formatting operations on messages received and sent from/to network 230. Further, an external switch port may perform zero, one, or more service tasks (ST). For example, external switch port 224 (representative of ports 206) can perform an instance of parse process 352, format process 354, and zero, one, or more service tasks 356 of a first type 1.(ST1). Flow and context store 360 may include content addressable memory, 258, as discussed above, that is particular to one external switch port or is shared by any suitable number of external switch ports. For example, flow and context store 360 includes information copied from or consistent with database records of path, access control, and map (PAM) store 334 discussed above. In alternate embodiments, flow and context store 360 may be stored in memory 258 or 253, thereby being accessible by any switch port 206 via bus 242. In an alternate implementation, store 360 may be stored, wholly or in part, in memory integral to each switch port. Store 360 is addressable by flow tag, subflow tag, and exchange tag to provide respectively flow data, subflow data, and exchange data. A switch port, according to an ST1, may direct messages to any intermediate host port, and/or other switch port.

An intermediate switch port performs parsing and formatting operations on messages received from, and sent to intermediate host ports. Further, an intermediate switch port may perform zero, one, or more service tasks. Intermediate switch port 222 performs an instance of parse process 372, format process 374, and one or more service tasks 376 of type 2. An intermediate switch port (e.g., 222) may have access to a flow and context store 360 used by external switch ports (e.g., in memory 258), and it may have access to PAM store 334 (e.g. in memory 253).

A user 302 of node 200 (FIG. 7) is typically a person trained in network administration who is responsible for defining and revising a network architecture in which node 200 is installed. User 302 reviews results of discovery conducted thru switch ports 206, defines virtual peripherals for use by hosts (e.g., 110), and defines the protocols, identities, capabilities, and configuration of switch ports with respect to network 230 (e.g. creating, modifying, or deleting virtual network ports hosted on network node 200). These activities are divided roughly into node administration and PAM administration. A common user interface (e.g. graphical user interface) may be implemented to present these administrative operations as an integral user interface.

In one embodiment, application program layer 304 may provide a node administrator 312, PAM administrator 314, and zero, one, or more service tasks 320 (ST4). Node administrator 312 reads status of various components of network node 200 (e.g. switch ports) and provides status reports to user 302. Further, node administrator 312, as directed by user 302, issues commands to control the configuration of various components of network node 200 (e.g. switch port). Node administrator 312 may also implement virtual peripherals by interacting with PAM administrator 314, which correspondingly stores/updates suitable database records accessed by external and internal switch ports (e.g., updating contents of PAM store 334 and/or flow and context store 360).

Path, access, and map (PAM) administrator 314 initiates changes to PAM store 334, and thus correspondingly to related stores (e.g. flow/context store 360), as directed by user 302. Process 314 provides a user interface to user 302 (e.g. graphical and/or command-line) for defining and revising relationships between identifiers (e.g., addresses) of the entities that communicate in system 100. These entities, for example using SCSI protocol terminology, include initiators (e.g., host 110, network node 200), initiators' ports to network 230, targets' ports to network 230 (including peripherals, such as direct-access disk devices, hosted by these target ports), and targets (e.g., peripherals 122-124, network node 200). The user, having knowledge of the entities and their identifiers, cooperates with PAM administrator 314 to add, delete, and revise records in a database that may include one or more tables referred to by various processes. Each record provides access to a stored relationship between entities, for example, as a tuple of addresses (e.g., virtual address to physical address, switch port address to intermediate host port address). The database records may be stored and accessed using any conventional technology, and they may be created/updated/deleted dynamically (e.g. mapping information may be "lazily configured" (i.e., dynamically configured as needed) by the PAM administrator when a service task requests access for processing a received message). In one implementation, all records are combined into a single memory area or file. In another implementation, each type of record is stored in a separately accessible list and each may be stored in distinct memories (e.g. 253, 258, or internal to switch ports 206). Lists may contain references to portions of other lists. As described herein, the data stored in PAM store 334, flow/context store 360, or any subset thereof, is collectively referred to as "mapping information." Furthermore, in various embodiments, the mapping information may comprise some or all of the information or data contained in Tables 1-3 herein.

Generally, PAM administrator 314 may identify any of several services as available for a particular host, for a particular target, a particular combination of host and target, and/or for a particular virtual peripheral. A suitable instance of a service (i.e., a task) is launched in any conventional manner prior to providing the service. In one implementation, PAM store 334 includes indicia of the identity of one or more service tasks to be used (or launched). These indicia are placed in PAM store 334 by PAM administrator 314 in response to input from user 302. In an alternate implementation, launch of an instance of a service task (e.g., task 324) follows consequently from a suitable request by an initiator.

A service may be implemented by one or more service tasks. In accordance with one embodiment of the invention, service tasks are described herein as having one of four types or levels. In an exemplary embodiment, a service task 356 of a first type (ST1) is performed by an external switch port when data from flow and context store 360 and PAM store 334 in memory 253 and/or memory 258 are sufficient for completing the task without inefficient use of processing resources of the switch port and when sufficient processing resources are available at the switch port. Service task 356 may be implemented by one or more instances of task 356 that may operate independently. In one embodiment, the classification level of a service task, and the designation of which tasks are to be performed by the switch ports 222 and 224-226 is configurable by a user who can define what tasks will be performed by which hardware entities.

A service task 376 of second type (ST2) is performed by an intermediate switch port 222 when data from flow/context store 360 and/or PAM store 334 in memory 253 and/or memory 258 (e.g., accessed by intermediate switch port 222) are sufficient for completing the task without inefficient use of processing resources of intermediate switch port 222 and when sufficient processing resources are available at intermediate switch port 222. Service task 376 may be implemented by one or more instances of task 376 that may operate independently.

A service task 342 of the third type (ST3) is performed by a processor (e.g., 251 or 252), within the context of driver layer 306, when data from flow/context store 360 and/or PAM store 334 in memory 253 and/or memory 258 are sufficient for completing the task. ST3 may provide any or all services provided by lower layer service tasks (e.g. ST2 and ST1), as well as additional services that they do not provide. In one embodiment, driver layer 306 may be implemented with processing resources resulting in particular efficiency advantages compared to application program layer 304. However in other embodiments, various combinations of application program layers and kernel layers may be implemented to perform service tasks of the third type (ST3) 342 as desired by a user. Service tasks 342 may be implemented by one or more instances of task 342 that may operate independently.

A service task 322 of type 4 is performed by a processor (e.g., 251 or 252) within the context of application program layer 304. In one embodiment, a set 320 of service tasks of the fourth type (ST4) includes one task 322 that can provide all services for node 200 for all network traffic. Thus, in one embodiment, ST4 task set 320 comprises a superset that includes all lower layer service tasks provided by the ST3, ST2, and ST1 layers. In an application where it is desirable to process network traffic by multiple instances of the same or different tasks (e.g., 322 through 324), any number of tasks 320 may be launched.

An exemplary database containing mapping information for a storage area network (SAN) implementation is provided by Table 2 below. Each peripheral of the SAN is a data storage device communicating via the SCSI protocol. Virtual peripherals (e.g., virtual disk storage devices) desired to be accessed are identified in network messages between host 110 and node 200 by a physical initiator port, a virtual target port (e.g., a virtual peripheral address), and a virtual logical unit number. Depending on the type of virtual peripheral (e.g. disk, tape), the message may also include a virtual logical block address (LBA) corresponding to the desired virtual storage location. The LBA may comprise fields specifying a page, a segment of the specified page, and a block of the specified segment within the memory storage device. Database records, including, without exclusion, the mapping information and other types of information as discussed above, may be stored in memory 253 (e.g. PAM store 334), memory 258 (e.g. flow/context store 360), and/or memory that is integral to ports (e.g., 204 and/or 206). Database records may be accessed by any conventional method, including content addressable memory techniques, linked list, and array techniques. Database records may be accessed by any processor of node 200 including processors 251 and 252 (executing service tasks ST3), ports 204, and/or ports 206 (executing service tasks ST1 or ST2).

TABLE 2

| Record Type | Field | Description |
| --- | --- | --- |
| Discovered remote port table entry | | There is one table that contains information describing all network nodes accessible by node 200. Each table entry describes a port on a remote network node. Entries are created for each result of discovery or notification of a remote port being removed from or joined to the network. |
| | Name | Name(s) associated with the bank, drive, or volumes of this peripheral (e.g. world-wide port name). |
| | Address | Identifier(s) for use with messages directed to the peripheral, for example, a target identity (e.g. Fibre Channel port ID). |
| | Capability | Capacity (e.g. number of LUNs), protocol (e.g. initiator and/or target), and/or conventional descriptions. |
| | State | May include whether or not any portion of the physical peripheral is registered with node 200, access criteria, on-line status, and/or conventional operational status. |
| Page table entry | | There is one page table for each logical unit presented from a switch port of node 200. Each logical unit is identified by a logical unit number (LUN). One record for each page supported for that logical unit, where each page represents a logically contiguous block range. The logical unit is typically a virtual logical unit composed of virtual segments implemented by any number of physical peripherals. |
| | Page state | States include:<br>Forward -- all I/Os received at a switch port are forwarded toward another service task (typically an ST4).<br>Quiesced -- all I/Os received at a switch port are queued for later processing (e.g., I/Os to be subsequently processed by ST1, ST2 or ST3 when quiesced state is unset by ST4).<br>Read-Only -- all I/Os received at a switch port which do not modify the data mapped by this page are allowed to be processed (e.g. by ST1, ST2, or ST3) unless accessible routing information, protocol logic, and/or processing resources are not sufficient (e.g., non-Read I/Os) in which case control of the I/Os is passed to another service task (e.g., I/Os to be subsequently processed by ST1, ST2, or ST3 when read-write state is configured by ST4).<br>Read-Write -- all I/Os received at a switch port that access/modify data mapped by this page are allowed to be processed (e.g. by ST1, ST2, or ST3) unless accessible routing information, protocol logic, and/or processing resources are not sufficient (e.g., non-Read/Write I/Os) in which case control of the I/Os is passed to another service task (e.g., I/Os to be subsequently processed by ST1, ST2, ST3, or ST4).<br>Zero-filled -- all I/Os can be responded to with all zero data (e.g., I/Os to be processed by ST1, ST2, ST3, or ST4; typically an ST3). |
| | Segment table ID | Identifier of a Segment table (discussed below) applied to this page. The ID may be a name, handle, pointer, or address. |
| Segment table entry | | There is one segment table for each page table entry. A segment table refers to a group of physical segments that may be distributed on one or more physical peripherals. Each segment provides storage for reading and/or writing data. A segment is identified and addressed via a starting logical block address (LBA). One segment table entry for each contiguous range of physical blocks of the page. Any particular block range may be referred to by zero, one, or several segments in any number of pages. |
| | Segment state | All states described above for a page table entry may be implemented here for efficient access by a switch port. |
| | Reg. Per. table ID | Identifier of a Registered Peripheral (discussed below) describing a peripheral on which the addressed block (discussed below) may be found. The ID may be a name, handle, pointer, or address. |
| | Start LBA | The starting address of the physical segment associated with this segment table entry. The size of this segment may also be specified or presumed as a design constant. |
| Registered Peripheral table entry | | There is a Registered Peripheral table entry for each peripheral that has been discovered and subsequently registered for mapping to a virtual peripheral identifier to a switch port of node 200. |
| | Reg. Per. State | Invalid -- all I/Os associated with this peripheral (e.g., mapped by a page/segment) are passed toward another service task (e.g., I/Os subsequently processed by an ST1, ST2, or ST3 when this entry is enabled by ST4).<br>Valid -- all I/Os associated with this peripheral (e.g., mapped by a page/segment) may be forwarded to the specified physical |

TABLE 2-continued

| Record Type | Field | Description |
|---|---|---|
| | | peripheral. Valid and Invalid states provide a mechanism for path and access control. |
| | Target ID | An identifier of the remote port (relative to the network 230) used in messages to this logical unit (e.g., a D_ID). |
| | LUN | The logical unit number for this peripheral. |
| | Switch port ID | An identifier (relative to the fabric 232) of a physical switch port of node 200 (e.g., 225) associated with this registered peripheral. In a typical installation, the peripheral is accessible via network 230 via the specified switch port (e.g., as described in Table 1). |
| Flow tag | | A Flow table can be accessed from each switch port by content (e.g. using content addressable memory). The table entry address is called a flow tag and the data associated with the tag is called flow data. A flow corresponds to a logical connection (e.g. Fibre Channel N_port login) between virtual network ports hosted within, and by, network node 200 and remote network ports (i.e. ports in connection with network 320). |
| | S_ID | Identifier (relative to the network 230) of the source port (e.g. FC port ID of remote host) of the message. |
| | Ingress switch port ID | Identifier (relative to the fabric 232) of the switch port that received the message. |
| | D_ID | Identifier (relative to the network) of the destination port (e.g. FC port ID of virtual network port hosted by network node 200) for the message as intended by the source. |
| Flow data | | Flow data is available when a flow table entry is successfully addressed using its flow tag. Flow data may include data from a random access memory (e.g. addressed by the CAM). |
| | Action | Drop -- take no action in response to receiving the message associated with the flow tag. Route -- normal processing. Forward -- route this message toward another service task (e.g. ST3 via an intermediate host port). |
| | Subflow exists | Binary flag alerting to whether a Subflow tag should be created and used to access Subflow data. |
| | Flow ID | An identifier used in the subflow tag. |
| Subflow tag | | A Subflow table can be accessed from any switch port by content (e.g. using content addressable memory). The address is called a subflow tag and the data associated to the tag is called subflow data. In reference to SCSI terminology, a subflow corresponds to an I_T_L nexus for a virtual peripheral hosted by network node 200. |
| | S_ID | Identifier (relative to the network 230) of the source port (e.g. FC port ID of remote host) of the message. |
| | LUN | Logical unit number which is the subject of the message. Typically this is a virtual LUN for which a Page table exists (i.e. virtual peripheral hosted by the specified destination port). |
| | Flow ID | An identifier obtained from the Flow data. |
| | Ingress switch port ID | Identifier (relative to the fabric 232) of the switch port that received the message. |
| | RW | Binary flag indicates if the received message is a read or a write operation (applicable only to R/W I/Os). |
| Subflow data | | Subflow data is available when a subflow table entry is successfully addressed with a subflow tag. Subflow data may include data from the random access memory, as addressed by the subflow tag. |
| | Subflow State | Describes state of virtual LU associated with this subflow. All states described above for a page table entry may be implemented here for efficient access by a switch port. |
| | Virtual LU handle | Specifies the metadata describing the physical data (e.g. page table) corresponding to virtual LU associated with this subflow. Provides access from the switch port circuit (e.g., a packet processing engine) to the mapping and state information necessary to process the I/O (e.g. discussed above with reference to Page table, Segment table, and Registered Peripheral table). |
| | Exchange Flow ID | An identifier used in an Exchange tag assigned for processing of this I/O. |
| Exchange tag | | An exchange table can be accessed from each switch port by content (e.g. using content addressable memory) where the address is called an exchange tag and the data associated to the tag is called exchange data. Field values are used for translation between the "virtual" exchange (i.e. for the remote host accessing a virtual peripheral) and the "physical" exchange (i.e. for the physical remote peripheral) provided in the Exchange data. |
| | OX_ID | Originator's exchange identifier from the received message frame. |
| | RX_ID | Responder's exchange identifier from the received message frame. |

TABLE 2-continued

| Record Type | Field | Description |
| --- | --- | --- |
| | S_ID | Identifier (relative to the network 230) of the source port (e.g. FC port ID of remote network node) of the message. |
| Exchange data | | Exchange data is available when the exchange table entry is successfully addressed with an Exchange tag. Exchange data may include data from a random access memory addressed by the exchange tag. |
| | Switch port ID | Identifier (relative to the fabric) of the switch port that received the message. |
| | D_ID | Identifier (relative to network 230) of the destination port (e.g. FC port ID of initiator or of target, depending on direction) for the message. |
| | X_ID | OX_ID from initiator; or RX_ID from XFER_RDY or Read DATA frames from target. |
| Virtual Network Port Table | | There is one table for each node 200 that identifies, for each virtual network port, the external switch ports, intermediate switch ports, and intermediate host ports, to be used for exchanging messages between the external switch port and processor circuit 202. External switch ports that receive messages directly from network 230 may refer to the intermediate switch port for forwarding messages to the intermediate host port, and vice versa. |
| | Virtual Network Port ID | A unique (relative to network 230) identifier of virtual network port hosted by node 200. |
| | External Switch Port ID | A unique (relative to fabric 232) identifier of an external switch port that is mapped to the virtual network port. |
| | Intermediate Host Port ID | A unique (relative to a network node 200) identifier of the intermediate host port associated with the external switch port (e.g. FC port ID). |
| | Intermediate Switch Port ID | An identifier (relative to the fabric 232) of an intermediate switch port that provides access to the associated intermediate host port. |

Driver layer 306 includes switch port control process 332, discover process 336, translate process 338, forward process 340, and any number of service tasks 342 of type 3 as discussed above. Switch port control process 332 informs node administrator 312 of the quantity and identity of all switch ports, external and internal, to facilitate configuration control. Switch port control process 332 also, as directed by node administrator 312, defines and revises access to specific portions of flow/context store 360 related to specific switch ports.

Discover process 336 determines the quantity, identity, logical unit numbers, and capabilities of all members of network 130 whose messages pass through switch ports of node 200. This information is provided to PAM administrator 314. PAM administrator may initiate discovery by directing discover task 336 to perform limited or global discovery. Preferably, discover task 336 automatically performs discovery (e.g., on node startup) and automatically reports changes in membership (or operational status) of hosts and peripherals coupled to ports of node 200. Conventional discovery technology may be used including initiating discovery requests using node 200 as the requesting entity. In one implementation, discovery constitutes an storage service where virtual network ports hosted by network node 200 are visible to the network as a host and/or target (e.g. via name service registration with the network).

A translate process receives messages from an intermediate host port and, with reference to routing information, prepares other messages to accomplish the intent of the received messages. For example, received messages may request data from a virtual peripheral and prepared messages may request the corresponding data from one or more physical peripherals. Translate process 338 receives messages destined for a virtual network port hosted by network node 200 (i.e. forwarded by switch ports 206 to any intermediate host port of set 204), reads PAM store 334 to accomplish virtual to physical mappings, and prepares messages to be sent by any physical peripheral (i.e. by forwarding to switch ports 206 via intermediate host port of set 204). The intermediate host port(s) 204 and/or external switch port(s) 206 to be used for sending the prepared message may be specified by PAM store 334 and flow context store 360 (e.g., including integral memory of internal switch port 222). Translate process 338 may perform translation for one or both of storage virtualization (i.e. translation between virtual data blocks to physical data blocks) and virtualization of network ports (i.e. translation between external port identities to internal port identities). The provision of service tasks for virtual network ports may be provided by process 338 or by processes 356, 376, 342 in any combination.

A forward process provides an interface between a service task and an intermediate host port. The interface includes message processing and message routing functions. For example, forward process 340 communicates with service tasks 320 of application program layer 304 and service task 342 (representative of any number of tasks) in driver layer 306. Messages received by an intermediate host port 204 are forwarded by process 340 to a service task in layer 304 or 306. Messages originated by an service task in layer 304 or 306 are forwarded by process 340 to an intermediate host port 204. Message processing and routing functions are determined by process 340 with reference to path, access, and map store 334.

Figure 3:
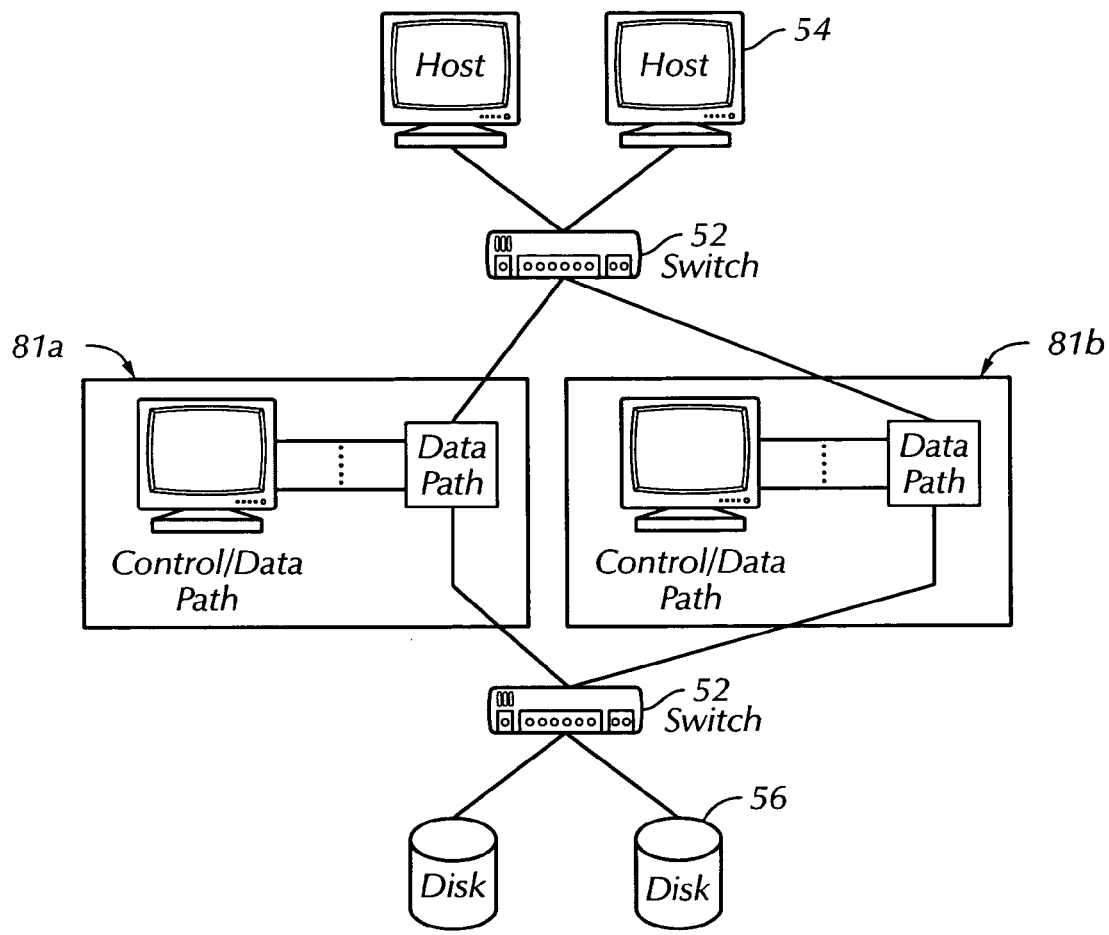
FIG. 3 illustrates a SAN having two hybrid network nodes in accordance with one embodiment of the invention.
Figure 8:
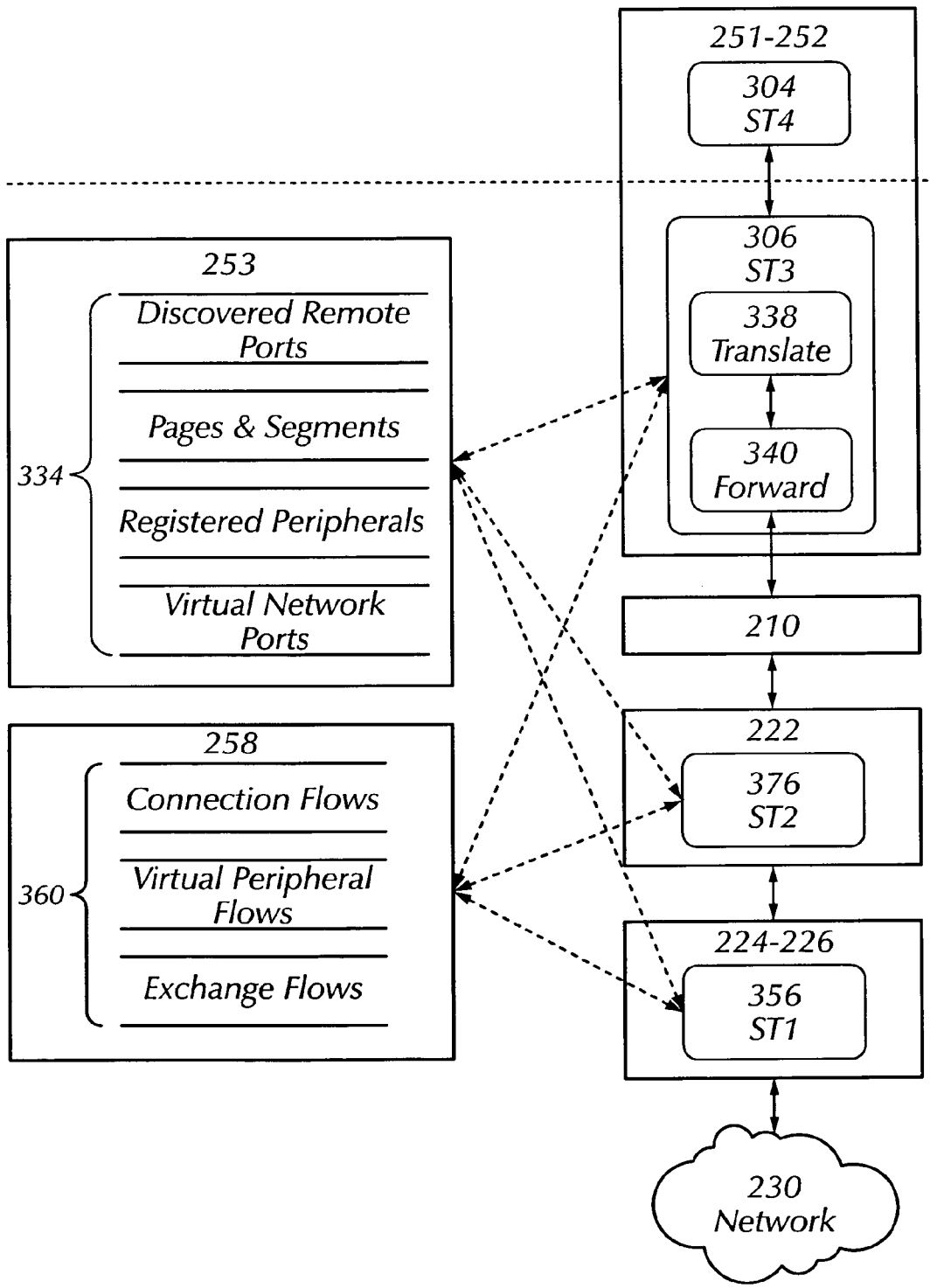
FIG. 8 illustrates a block diagram of service layers and their interconnections and access of mapping information from two memories, in accordance with one embodiment of the invention.
Figure 9A:
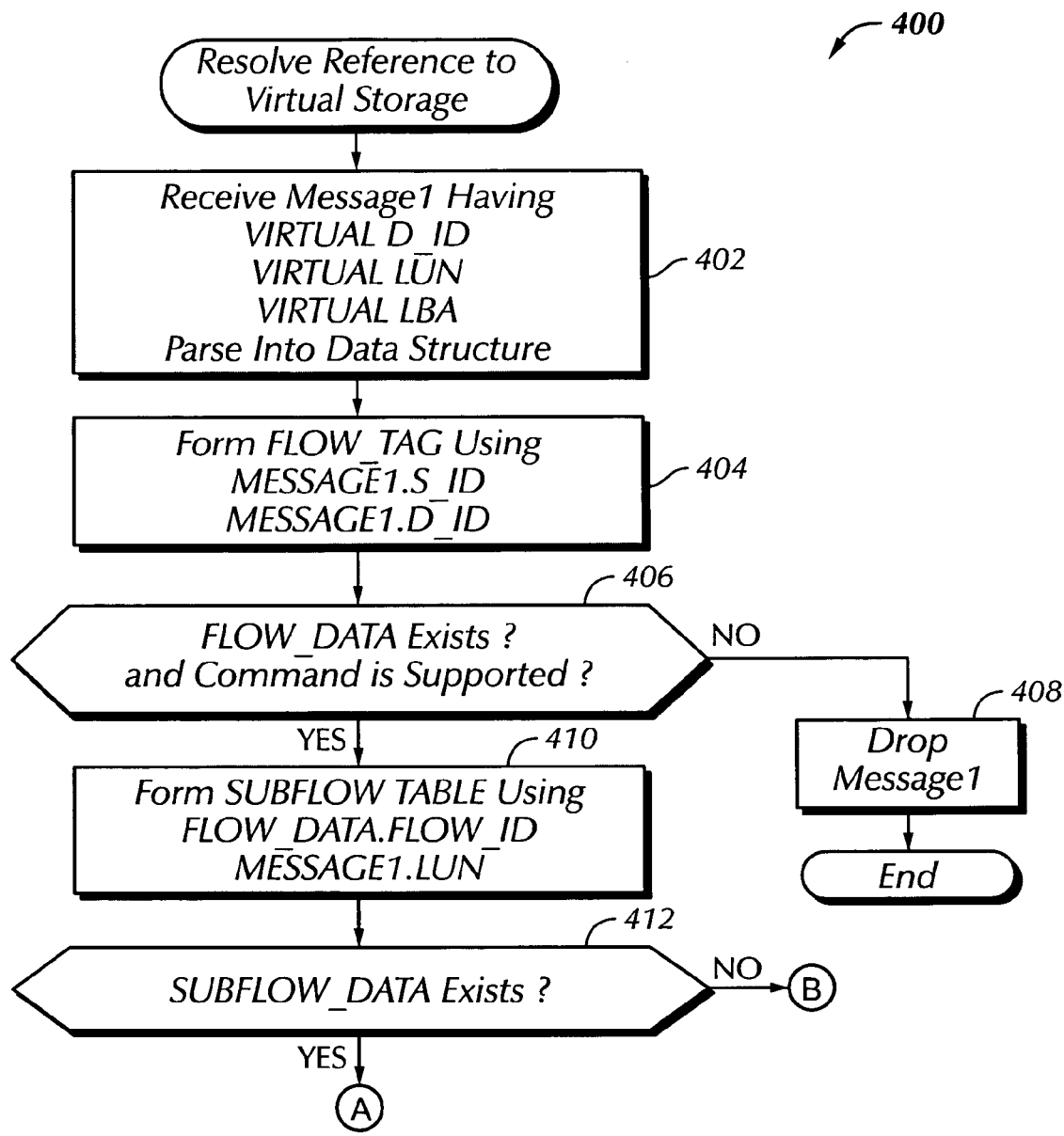
FIGS. 9 A-E illustrate a process flow diagram of a method for resolving a reference to virtual storage in a storage area network, in accordance with one embodiment of the invention.
Figure 9B:
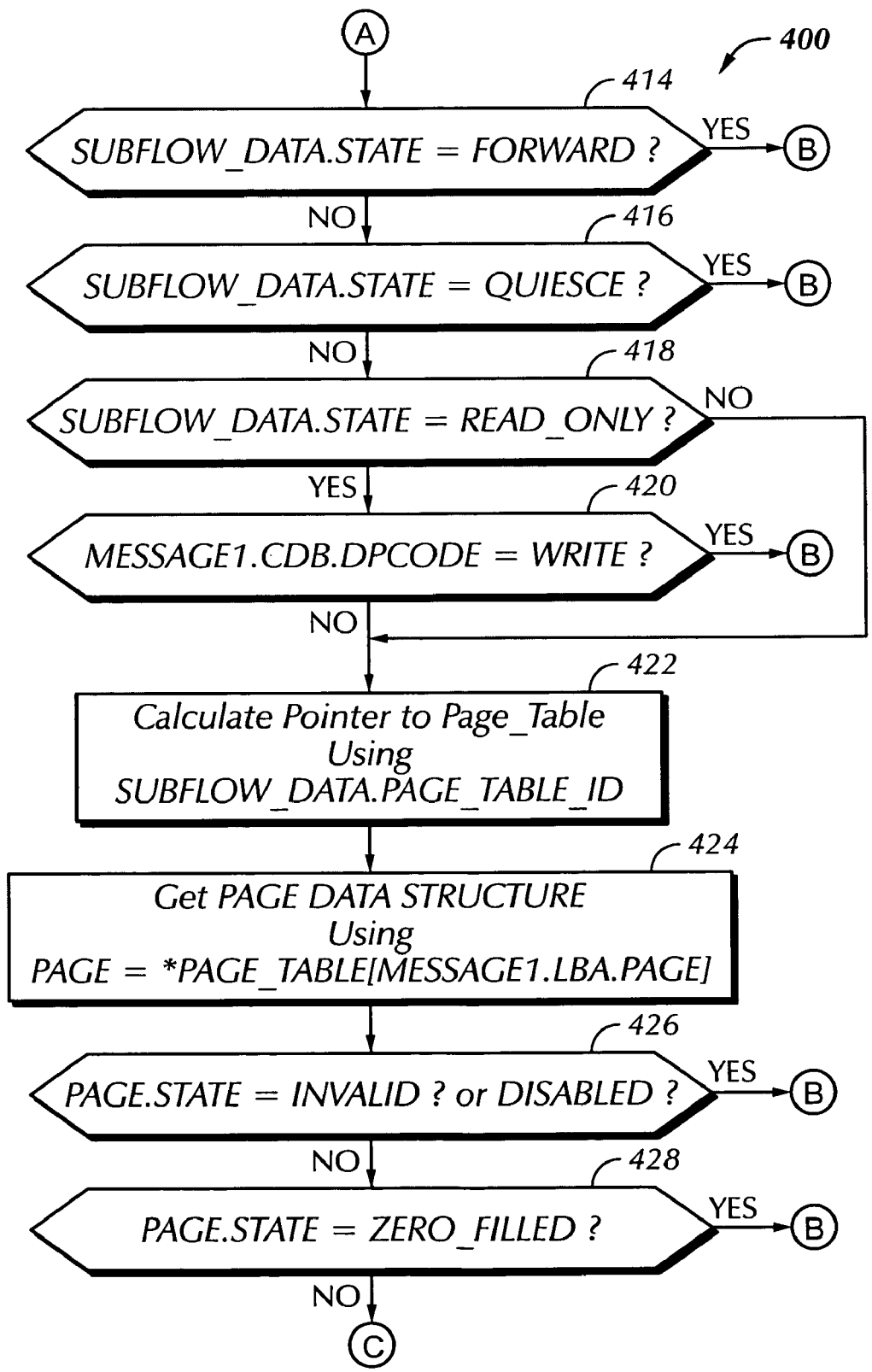
Figure 9C:
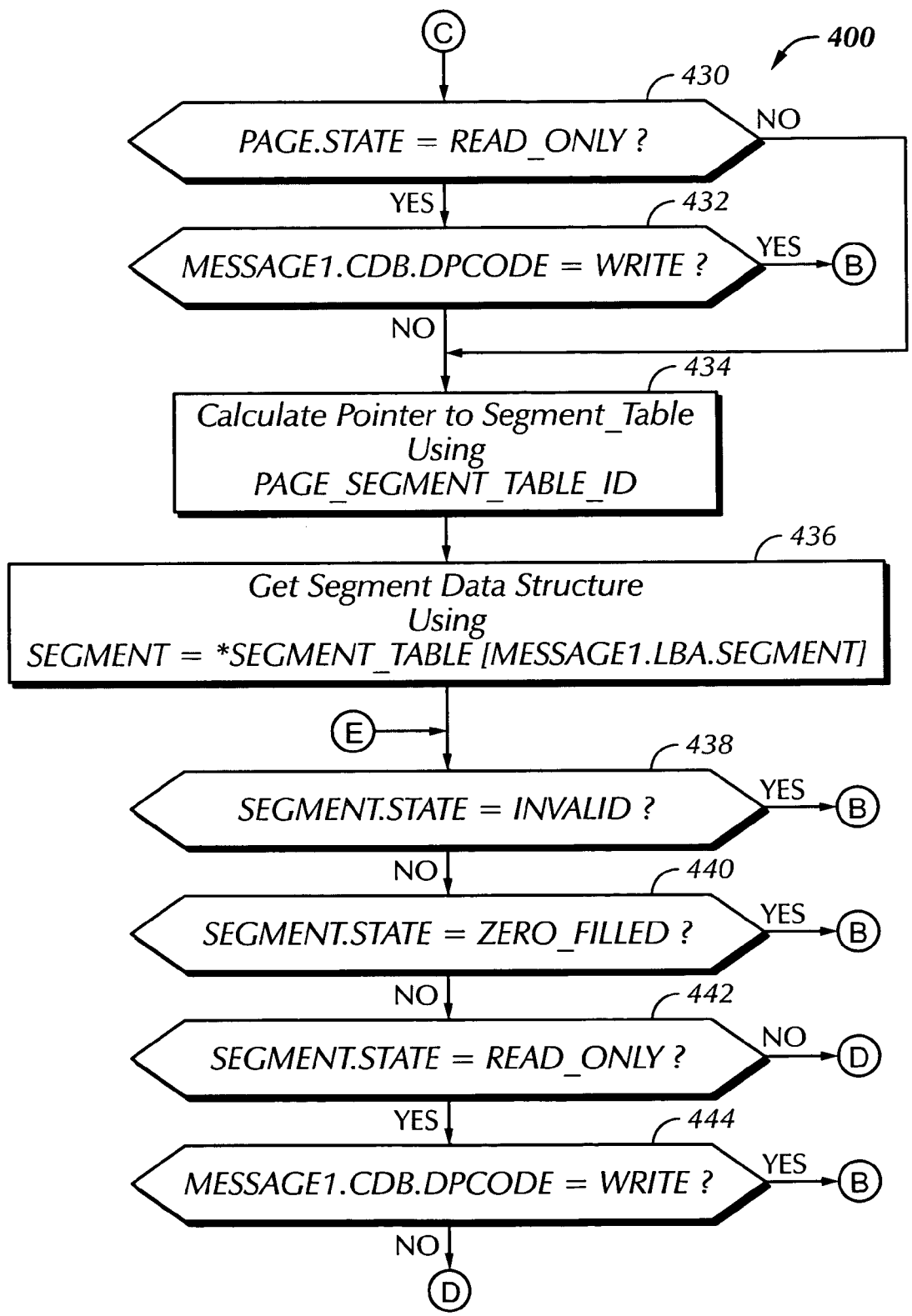
Figure 9D:
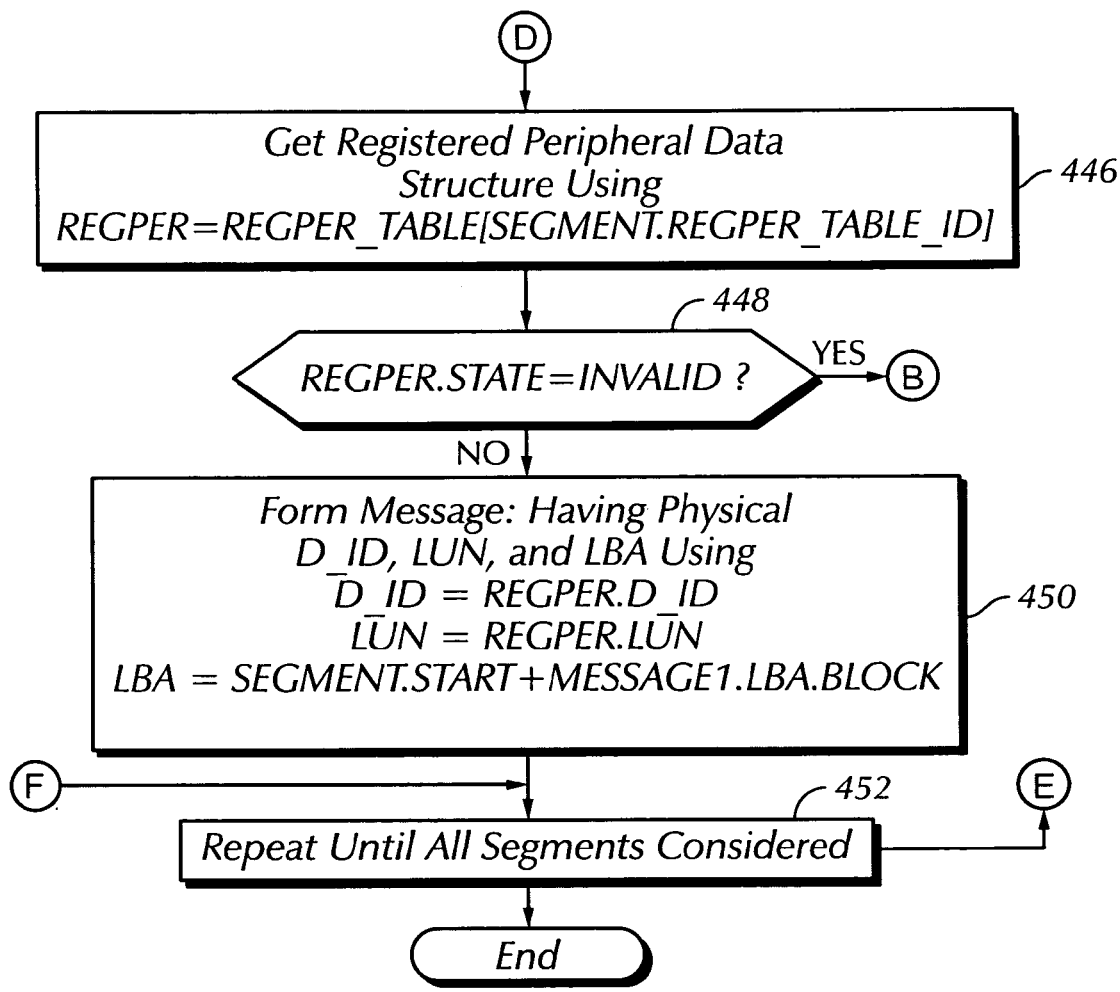
Figure 9E:
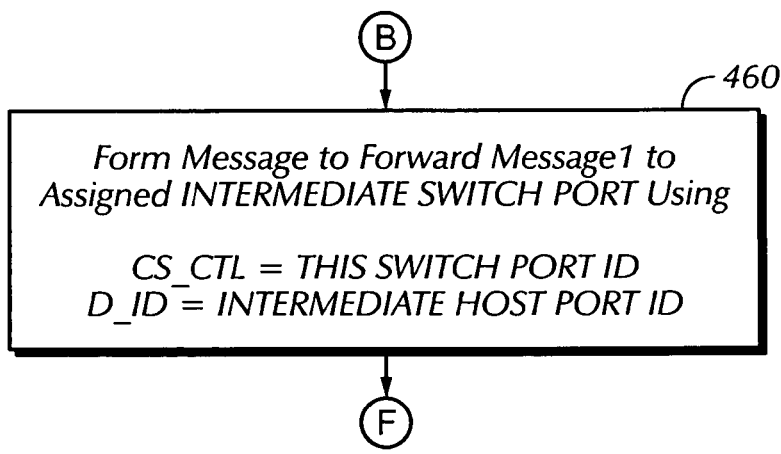

FIG. 8 is a flow diagram illustrating an exemplary mapping of service tasks and related data structures with software and hardware layers of one system embodiment. RAM 253 stores structured data 334 (as previously described in Table 2) relating to discovered remote ports, pages & segments, registered peripherals, and virtual network ports. CAM 258 stores structured data 360 (as previously described in Tables 2) relating to connection flows (e.g., flow data), virtual peripheral flows (e.g., subflow data), and exchange flows. Service task software is organized in four layers from ST1 to ST4. As shown in FIG. 3, ST1 356 executes on external switch ports 224-226 and can communicate with network 230, RAM 253, CAM 258, and intermediate switch port 222. ST2 376 executes on intermediate switch port 222, and communicates with ST1 356, intermediate host port 210, and RAM 253 and CAM 258. Intermediate host port 210 serves as a communication bridge between intermediate switch port 222 and processors 251-252. Processors 251 and 252 execute ST3 306 that translates 338 and forwards 340 data transfers, and communicates with intermediate switch port 222 through intermediate host port 210, as well as RAM 253 and CAM 258. Processors 251 and 252 also run ST4 304 that manages and communicates with ST3. ST4 also provides a user interface to a system administrator for system configuration and monitoring.

In one implementation of system 100 having particular synergies for application service providers, storage service providers, and storage area management, network 130 supports protocols of the type known as SCSI protocols over Fibre Channel protocols. Systems of this type are implemented in accordance with the SCSI-3 family of standards and compatible specifications described, inter alia, in http://www.t10.org/scsi-3.htm and available through NCITS Online Store managed by Techstreet 1327 Jones Drive Ann Arbor, Mich. 48105 (http://www.techstreet.com/ncits.html), particularly those standards identified as "Information technology—SCSI-2 Common access method transport and SCSI interface module" (CAM), "Information technology—SCSI Architecture Model-2" (SAM-2), (SBC), "Information Technology—SCSI Block Commands-2" (SBC-2), "Information Technology—SCSI Reduced block commands" (RBC), "Information Technology—SCSI-3 Stream commands" (SSC), "Information Technology—SCSI Stream commands-2" (SSC-2), "Information Technology—SCSI-3 Medium changer commands" (SMC), "Information Technology—SCSI-3 Medium changer commands-2" (SMC-2), "Information Technology—SCSI-3 Multi-media commands" (MMC), "Information Technology—SCSI-3 Multi-media commands-2" (MMC-2), "Information Technology—SCSI-3 Multi-media commands-3" (MMC-3), "Information Technology-SCSI-3 Reduced Multi-media commands" (RMC), "Information Technology—SCSI-3 Controller commands" (SCC), "Information Technology—SCSI Controller commands-2" (SCC-2), "Information Technology—SCSI-3 Enclosure commands" (SES), "Information Technology—Object-Based storage devices" (OSD), "Information technology—SCSI Primary Commands-3" (SPC-3), "FIBRE CHANNEL Switch Fabric-2" (FC-SW-2), "Fibre Channel" (FC), "Fibre Channel Protocol" (FCP), "Information Technology—Fibre Channel Protocol for SCSI, Second Version" (FCP-2), and "FIBRE CHANNEL Framing and Signaling" (FC-FS). In other embodiments, SCSI protocols over protocols other than Fibre Channel protocols may be used with ports as discussed above. In other words, a router may support virtual SCSI transactions, for example, over a port that supports a protocol such as SCSI Parallel Interface, Internet SCSI Protocol (IETF RFC 3720), Serial Bus Protocol, IEEE 1384 (Fire wire), SSA SCSI-3 Protocol, Scheduled Transfer, and Virtual Interface all of which are the subject of current public standards and draft standards.

Generally, parsing refers to determining the beginning, extent, and meaning of portions of a frame; and formatting generally refers to arranging data for transmission as a frame by placing data in the order defined by the protocols. A conventional host bus adapter (HBA) performs parsing and formatting functions to simplify the communication by software running on processor 251 or 252 for operations of network 230. An intermediate host port 210 may perform all of the functions of a conventional host bus adapter including parsing and formatting functions for the same, equivalent, or additional FCP IUs. Any suitable division of parsing and formatting responsibility may be used as the basis for design of intermediate switch port processes 372-376 and intermediate host port circuitry 204.

When a switch port receives a frame from any member of the network (e.g., host 110, peripheral 122, or peripheral 124), the switch port performs a routing function with reference to routing information. For example, routing includes determining an egress switch port for each frame received from an ingress switch port. Routing information is referred to by performing one or more lookups. Routing information is stored in any memory of node 200. The routing function includes modifying the frame as necessary prior to forwarding the frame to the destination indicated in the routing information. For example, external switch port 224 determines a destination switch port (226) by performing a flow lookup and/or a subflow lookup as described in U.S. patent application Ser. No. 10/120,266 referred to above. A flow lookup and/or a subflow lookup may refer to memory of the switch port itself (e.g., part of 224, not shown), or memory accessible to several switch ports (e.g., content addressable memory or, random access memory of memory 258 or random access memory 253). Routing information may also indicate routing of the frame to a service task. The destination switch port in that case may identify an intermediate host port 204.

An exchange flow corresponds to an I_T_L_Q nexus (i.e. a SCSI task) comprising a task tag (e.g., X_ID) and port identifiers (e.g. S_IDs and D_IDs). For example, in FCP, an I_T_L_Q nexus is represented by a fully qualified exchange identifier (FQXID) that includes an initiator identifier (I), a target identifier (T), logical unit (L), an OX_ID, and an RX_ID. However, a subflow, as discussed herein, corresponds to an I_T_L nexus, and a flow corresponds to an I_T nexus.

The terminology used to describe system 100 may differ somewhat from the terminology defined in the FCP specifications. In the FCP specifications, a fabric is an entity having ports that routes frames between its ports using the FC-2 header. A path is a route through the fabric from a source to a destination. A path may include one or more hops. A fabric may include multiple switches, each switch being an entity defined as a fabric element having ports, a path selector, an address manager, a fabric controller, a router, and a switch construct that transports frames between ports as directed by the router. A router, as defined in the FCP specifications, is an entity within a switch that determines for each received frame what port to direct the received frame so as to accomplish a connectionless delivery. System 100 is described herein in broad terminology as an example of an implementation according to various aspects of the present invention. To prepare an FCP SCSI implementation according to various aspects of the present invention, the specific functions of the FCP and SCSI protocol specifications are generally mapped as an instance of the functions and structures described herein that may bear the same or different nomenclature.

As discussed above, routing information as determined by an administrating process or a managing process may include an I_T, I_T_L, or I_T_L_Q nexus for a virtual or nonvirtual member or resource. For example, a managing process may launch a proxy for each I_T, I_T_L or I_T_L_Q nexus that refers to a virtual entity (e.g., a virtual port, or a virtual LUN). A service task as discussed above may be launched or used as the proxy.

As an example of the cooperation of the user, switch ports, intermediate host ports, and processes discussed above, consider a method for preparing a node of a network to present a virtual SCSI disk on one of its virtual SCSI ports. Prior to exposing functions of a virtual disk from a port of node 200, the storage areas to be used for functions of the virtual disk are mapped; and a virtual network port is associated with, and exposed from, a switch port (e.g. logged on to a Fibre Channel network.). Mapping includes forming an association between the virtual storage areas and the physical storage areas. Associations may be stored in a map. The map may be implemented in any combination of configuration memory as discussed above.

In a storage area network using SCSI over Fibre Channel, each virtual disk is accessible via one or more I_T_Ls. In this implementation, each intermediate host port includes the conventional functions of a host bus adapter (HBA). Discovery (336) provides a description (e.g. 315) of all physical storage devices coupled to ports of node 200. On request of user 302, PAM administrator 314 registers physical peripherals in PAM store 334 (i.e. creating Registered Peripheral table entries) to enable access to the registered physical disk.

PAM administrator 314 presents physical disk subsystems and their segments (i.e. subsets of their stored data) for selection by user 302 for inclusion in the virtual disk to be defined. From these selections, administrator 314 creates records in PAM store 334 including: (a) registered peripheral table entries for each selected physical disk; (b) a Page table with entries that identify each configured segment table; and; and (c) for each configured page table entry, a segment table containing entries that identify the physical segments for the virtual disk.

To permit access to the virtual disk by the defined initiator (e.g., the I of the I_T_L corresponding to the virtual disk defined above), a Page table handle and suitable state settings (e.g., page table state, flow state) are written as a subflow into flow and context store 360. Consequently, messages that subsequently arrive with values referring to the virtual disk are recognized by network node 200 and suitable tasks executed at the ST1 to ST4 layer levels.

In a first example, the tasks may include servicing 356, and sending a suitable response message thru the same or different external switch port (all accomplished within external switch port(s)). In a second example, the tasks may include servicing 356, forwarding to an intermediate switch port, servicing 376, and sending a suitable response message thru the same or different switch port (accomplished with external switch ports(s) and intermediate switch port(s)). In a third example, the tasks may include servicing 356, forwarding to an intermediate switch port, servicing 376, forwarding to an intermediate host port, translating 338, forwarding back to the intermediate switch port, servicing 376, and sending a suitable response message through an external switch port (accomplished with the additional participation of an intermediate host port and driver layer 306). In a fourth example, the tasks may include servicing 356, forwarding to an intermediate switch port, servicing 376, forwarding to an intermediate host port, servicing 342, forwarding back to the intermediate switch port, servicing 376, and sending a suitable response through an external switch port. In a fifth example, the tasks may include servicing 356, forwarding to an intermediate switch port, servicing 376, forwarding to an intermediate host port, forwarding 340, servicing 322, forwarding back to the intermediate switch port, servicing 376, and sending a suitable response through an external switch port. These examples illustrate some of the processing capabilities. Other examples could also include tasks such as parsing, formatting, servicing, routing, forwarding, translating, preparing a suitable response, routing the response, formatting, and sending by any combinations of external switch ports, intermediate switch ports, intermediate host ports, driver layer processes, and application program layer processes.

Servicing or translating as discussed above may include resolving a reference to virtual storage. For example, after a map and a configuration have been established as discussed above, a method for determining the physical storage to be used for a SCSI command that refers to virtual storage may be performed by a processor of a switch port without action by driver layer or application program layer processes. For example, FIG. 9A-9E describes a process 400 where a message from a host (e.g. 110) in the network is processed according to the mapping information (e.g. stores 334 and 360). In particular, process 400 describes the processing of a SCSI command received by an external switch port (i.e. by ST1) in a Fibre Channel network. However, this process is representative of any service task (e.g. ST1, ST2, or ST3) that examines the virtualization information configured by an application client (e.g. ST4) when a command is received by that respective service task.

In step 402 of process 400, a SCSI command (e.g. a read or a write) is received by an external switch port (e.g. 224) and parsed by ST1 to extract various identifying elements, including the network address of the initiating host port (e.g. S_ID=110), network address of the virtual target port (e.g. D_ID=224), logical unit number of the virtual peripheral (e.g. LUN=x), and some/all of the command descriptor block (e.g. operation code). ST1 In step 404, ST1 performs a lookup in store 360 for the flow (i.e. I_T nexus) referenced by this command (e.g. submits a flow tag to the CAM, which includes the S_ID and D_ID). If the flow tag is not found in step 406, ST1 may either drop the message (as indicated in step 408) or it may alternatively direct the message to an intermediate host port per step 460 (e.g. depending on the message type). If the command is not one that is directly supported by ST1 (e.g. operation code=Inquiry), then in step 409, the message is directed to an intermediate host port per step 460.

In step 410 of process 400, ST1 performs a lookup in store 360 for the subflow (i.e. I_T_L nexus) referenced by this command. This is done using the flow index from the flow found in step 406, along with other identifying elements of the message, including the LUN. If the subflow tag is not found in step 412, ST1 directs the message to an intermediate host port per step 460. If the subflow tag is found, step 406 may also include allocation of an exchange context in the exchange table (e.g. in store 360) for processing of subsequent frames on this I/O, which records the source (e.g. S_ID), destination (e.g. D_ID), and exchange identifiers (e.g. OX_ID, RX_ID) to use for either the virtual (e.g. between node 200 and host 110) or physical exchanges (e.g. between node 200 and peripheral 122).

The state of the virtual peripheral returned in the subflow data is examined to determine whether the message should be further processed or forwarded to the next service task (i.e. ST2). This may occur for various reasons, including if the state is Forward (step 414), Quiesce (step 416), or the command is a write but the state is Read-only (steps 418 and 420). Based on this state, ST1 may decide to perform the operation (e.g. if it directly supports the required functionality) or direct the message to an intermediate host port per step 460.

In step 422 of process 400, ST1 locates the page table based on the handle contained within the subflow data. In an alternate embodiment, this handle may be interpreted to reference other types of data structures (e.g. Registered Peripheral table entry) based on any qualifying indicators in the subflow data (e.g. a state value that indicates a "pass thru" directly to the physical peripheral). The page table's handle must be interpreted appropriately (according to conventional methods) as the table might be located in memories 258, 253, or both. For example, if both, the page table handle might be encoded to be fully qualified to indicate which memory's address space it applies; alternatively, handle values could refer to non-overlapping address ranges.

In step 424 of process 400, the virtual storage referenced by the message is interpreted to reference a specific page within the table. This can be calculated by ST1 using any conventional means, as based on the LBA. For example, if the page table entries reference regions whose sizes are fixed, equal and a power of 2, then the appropriate portion of the LBA can be used to directly index into the page table (e.g. a 1 GB page size uses the most significant 11 bits of a 32-bit LBA).

The state of the resulting page table entry is examined by ST1 to determine whether it should be further processed or forwarded to the next service task (i.e. ST2). This may occur for various reasons, including if the page is invalid or disabled (step 426), zero-filled (step 428), or the command is a write but the state is Read-only (steps 430 and 432). Based on this state, ST1 may decide to perform the operation (e.g. if it directly supports the required functionality) or direct the message to an intermediate host port per step 460.

In step 434 of process 400, ST1 locates the segment table based on the handle contained within the page table entry. The segment table's handle must be interpreted appropriately (according to conventional methods), depending upon whether the table is located in memories 258, 253, or both. For example, if both, the segment table handle might be encoded to be fully qualified to indicate which memory's address space it applies; alternatively, handle values could refer to non-overlapping address ranges.

In step 436 of process 400, the virtual storage referenced by the message is interpreted to reference a specific segment within the table. This can be calculated by ST1 using any conventional means, as based on the LBA. For example, if the segment table entries reference regions whose sizes are fixed, equal, and a power of 2, then the appropriate portion of the LBA can be used to directly index into the segment table (e.g. a 1 MB segment size uses the next most significant 10 bits of a 32-bit LBA).

The state of the resulting segment table entry is examined by ST1 to determine whether it should be further processed or forwarded to the next service task (i.e. ST2). This may occur for various reasons, including if the segment is invalid or disabled (step 438), zero-filled (step 440), or the command is a write but the state is Read-only (steps 442 and 444). Based on this state, ST1 may decide to perform the operation (e.g. if it directly supports the required functionality) or direct the message to an intermediate host port per step 460.

In step 446 of process 400, ST1 locates the Registered Peripheral table entry referenced by the segment table entry. The handle of the Registered Peripheral table entry must be interpreted appropriately (according to conventional methods), depending upon whether the table is located in memories 258, 253, or both. For example, if both, the Registered Peripheral table handle might be encoded to be fully qualified to indicate which memory's address space it applies; alternatively, handle values could refer to non-overlapping address ranges.

The state of the resulting Registered Peripheral table entry is examined by ST1 to determine whether it should be further processed or forwarded to the next service task (i.e. ST2). This may occur for various reasons, including if the registered peripheral entry is invalid or disabled (step 448). Based on this state, ST1 may decide to perform the operation (e.g. if it directly supports the required functionality) or direct the message to an intermediate host port per step 460.

In step 450 of process 400, ST1 modifies the message to address the physical storage that it is referencing. This step includes updating the message with the network address of the virtual initiator port (e.g. S_ID=225), network address of the physical target port (e.g. D_ID=122), logical unit number of the physical peripheral (e.g. LUN=$\alpha$), and the logical block address of the physical segment. The LBA for the physical region is calculated based upon the starting LBA specified by the segment table entry; for example, this can be calculated by adding the least significant 11 bits of a 32-bit LBA in the original message to the starting LBA specified in the segment table entry. Once the message is formed, ST1 forwards the frame to the external switch port hosting the specified virtual initiator port (e.g. via the backplane 232 to external switch port 225).

ST1 may implement support for handling I/Os which cross multiple segment boundaries (step 452). For example, this may be handled by either extending the transfer length of the current message (i.e. if additional segments are physically contiguous). In an alternative embodiment, in a cut-through frame processing model, multiple physical I/Os can be performed sequentially by converting a response frame from a previous physical I/O to the command frame of the next physical I/O.

In step 454 of process 400, ST1 forwards the message to the egress external switch port hosting the virtual initiator port of the newly formed message via backplane 232. Upon receipt of the message, the egress external switch port simply forwards the message to network 230. Subsequent processing of the frames associated with this I/O can be processed by performing a lookup for the exchange context (e.g. in store 360).

In step 460 of process 400, ST1 forwards the message to an intermediate host port based upon the mapping information for the virtual target port specified by the original message. The virtual network port table entry for the virtual target port indicates one or more intermediate host ports that the message may be forwarded to, as well as one or more intermediate switch ports associated with those intermediate host ports. The message is updated prior to forwarding to the selected intermediate switch port, including stashing an identity of virtual target port in the message (e.g. CS_CTL=224) and then setting the destination to that of the intermediate host port (e.g. D_ID=210). Once the message is formed, ST1 forwards the frame to the selected intermediate switch port (via the backplane 232) which then routes it to the intermediate host port.

A reference to virtual storage may be a reference to any number of virtual storage locations. Resolution continues in a loop from operation 452 for additional segments which may be located at different block addresses of the same or on different peripherals, where each segment may be processed whether synchronously or asynchronously with respect to one another. Resolution consequently produces a plurality of messages in each execution of operation 452 or 460.

In an alternate implementation, segment state may indicate additional services are to be applied to that segment (e.g., copy on write, journaling) that may refer to an additional storage location (virtual or physical). Resolution of such an indirect reference may proceed in another instance of method 400 (e.g., by multitasking spawn, or by recursive call).

Multiple service tasks may have efficient access to the mapping information. For example, a suitable page table data structure (e.g., a row of a Page table as discussed above) may be accessed (424) by ST-1, ST-2, ST-3, and/or ST-4 because flow and context store 360 and PAM store 334 are implemented in switch port memory (e.g., 224), memory 258, and/or memory 253. In one implementation, ST-1 has access via a MESSAGE1 data structure stored in switch port memory (e.g., 224), flow/subflow data stored in memory 258, and page/segment data stored in memory 253. ST2 has access similarly from an intermediate switch port 222. ST-3 and ST-4 have access to MESSAGE2 (in memory 253) by operation of forward process 340, and direct access to memory 253 (e.g. for page and segment tables) and memory 258 (e.g. for flows, subflows, exchanges).

Segment table access (436) by ST-1, 2, 3 or 4 and storage (224, 222, 258, 253) may be analogous to Page table access and storage, discussed above.

Registered peripheral table access (446) by ST-1, 2, 3 and/or 4 and storage (224, 222, 258, 253) may be analogous to Page table access and storage, discussed above.

In various alternate implementations, suitable portions of Page table, Segment table, and/or Registered peripheral table are redundantly stored (in whole or in part) in each switch port memory (224 or 222) or in common memory (258) to avoid access delays caused by shared access mechanisms (buses, addressing circuits, processors).

Because each processor hosting service tasks (ST-1, 2, 3 and/or 4) has access to suitable information referred to so as to perform process 400 (especially 450 and 460), portions of process 400 may be performed by any combination of processors (e.g., 224, 222, 210, 251, 252) on one or several messages to balance load and avoid access delays.

An external switch port may be configured to forward incoming frames to a physical host or peripheral without involving an intermediate switch port. In one implementation, forwarding from an ingress external switch port to an egress external switch port does not include storing message frames in a buffer an extended timeframe. Instead, frames are forwarded in a "cut through" manner, without either aggregating a number of frames prior to forwarding or deferring their processing in any way. Lower latency and higher throughput result. Cut-through may also be implemented to forward incoming frames to an intermediate host port (i.e. for processing by another service task such as ST3 or ST4); or from an intermediate host port (i.e. outgoing froms from another service task such as ST3 or ST4) to a physical host or peripheral via the external switch port.

Figure 10:
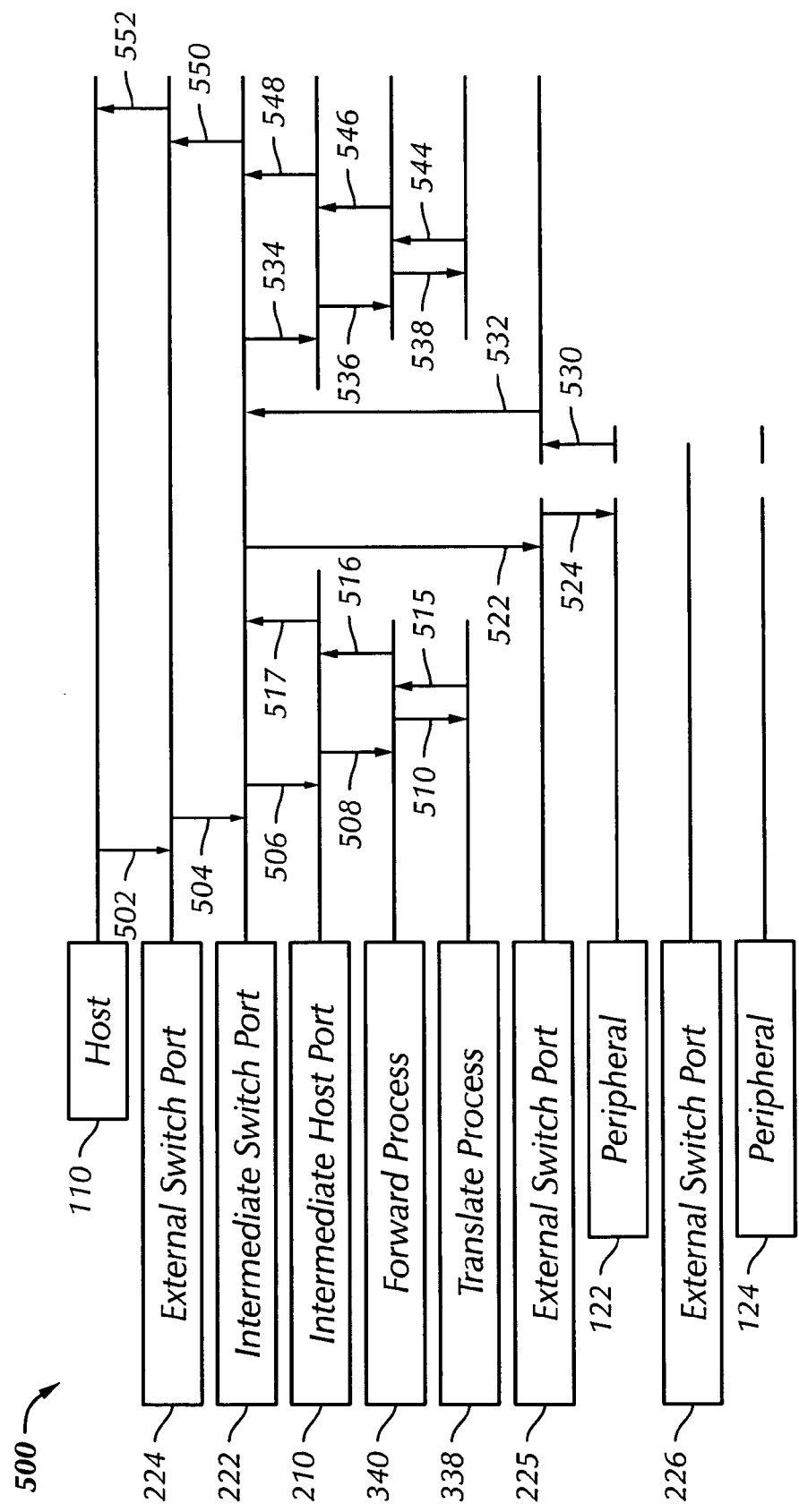
FIG. 10 a flow of service task provision.

As an example of the cooperation of switch ports and processes discussed above, consider message sequence 500 of FIG. 10 occurring in a storage area network (SAN) wherein the user (i.e., a human SAN administrator) has defined a virtual disk 123 comprising a portion of physical disk 122 and a portion of physical disk 124. When a first write operation is directed from host 110 to a region of virtual disk 123 supported in part by physical disk 122 and in part by physical disk 124, node 200 initiates a second write operation and a third write operation to accomplish the intent of the first write operation. If an exception occurs (e.g., on disk 122), node 200 may report the exception to host 110 as if node 200 was a physical disk.

Message sequence 500 is abbreviated for clarity of presentation. Some messages of each transaction are omitted and the replies from peripheral 124 are omitted (e.g. FCP_XFER_RDY or FCP_DATA IUs). Details of the message identifications in sequence 500 are discussed in Table 3 with reference to FIG. 10.

In Table 3, drawing reference numbers are used in place of the conventional binary identification numbers dictated by the messaging and transport protocols. A SCSI message protocol and Fibre Channel transport protocol are presumed for message sequence 500 and Table 3. For purposes of illustration, each external switch port is assumed to expose exactly one virtual network port (e.g. N_port) that can be addressed by other nodes in network 230. In message sequence 500, only upper level protocol messages are shown. Lower level protocol messages are subsumed to establish any other conventional identifications such as command sequence numbers and message sequence numbers.

TABLE 3

| Message | S_ID | D_ID | Other Field Values | Description |
|---|---|---|---|---|
| 502 | 110 | 224 | LUN = x<br>LBA = y<br>XFER_L = z<br>OX_ID = v | Host 110 sends a first write operation with data to be written to region (y, z) as if node 200 was a target. The first write operation has an I_T_L of 110-224-x. Flow and context store 360 relates external switch port 224 to virtual disk 123. Map 334 relates the first I_T_L and region (y, z) to part of disk 122 and part of disk 124. On ingress, external switch port 224 reads store 360/334 and finds that the first I_T_L is not defined, region (y, z) is marked read-only, and/or any other constraint. Consequently, external switch port 224 sends message 504 to an intermediate host port 204 indicated in store 360/344. |
| 504 | 110 | 210 | as in 502 with CS_CTL = 224 | Referring to store 360/344, external switch port 224 relates intermediate host port 204 with an intermediate switch port (e.g. 222) External switch port 224 preserves its identity for process 340 by discarding the original value of CS_CTL and setting CS_CTL to its own identity relative to fabric 232. It updates the destination to that of intermediate host port (i.e. D_ID = 210) and forwards the message to the associated intermediate port. |
| 506 | 110 | 210 | as in 504 | Intermediate switch port 222 uses link 211 to forward message 506 to intermediate host port 210.. In an implementation where link 211 provides access to multiple intermediate host ports, internal switch port 222 may refer to store 360 or 334 for routing information. |

TABLE 3-continued

| Message | S_ID | D_ID | Other Field Values | Description |
|---|---|---|---|---|
| 508 | 110 | 210 | as in 506 | Intermediate host port 210 provides access to the message by process 340 via one or more data structures (e.g., a message queue) pre-assigned for its use. |
| 510 | 110 | 224 | as in 508 except CS_CTL = 0 | On ingress of message 508, process 340 restores the identity of the external switch port (i.e. D_ID = 224) based on the CS_CTL field and then clears CS_CTL before forwarding the message 510 to translate process 338. |
| 515 | 225 | 122 | LUN = a LBA = b XFER_L = c | Translate process 338 recognizes the first I_T_L and region (y, z) as referring to virtual disk 123. To accomplish the write to region (y, z) of virtual disk 123, translate 338 initiates a second write operation (message 515). The second write operation is directed to LUN = a and physical region (b, c) of physical disk 122. The second write operation has a second I_T_L of 225-122-a |
| 516 | 210 | 122 | as in 515 with OX_ID = j CS_CTL = 225 | On egress, process 340 verifies map 334 and relates the second I_T_L and external switch port 225. Process 340 assigns OX_ID = j and sets CS_CTL to refer to external switch port 225. Process 340 selects one or more a suitable path to external switch port 225, including an intermediate host port (e.g., 210), and an intermediate switch port (e.g., 222) based on load sharing (e.g., latency, queue depth) and fail-over criteria (e.g., error rates). |
| 517 | 210 | 122 | as in 516 | Intermediate host port 210 forwards the message to intermediate switch port 222. |
| 522 | 225 | 122 | as in 517 except CS_CTL = 0 | On egress, intermediate switch port 222 copies the value from CS_CTL into the S_ID field, then clears CS_CTL. |
| 524 | 225 | 122 | LUN = a LBA = b XFER_L = c OX_ID = j | Message 524 appears to disk 122 as if node 200 was a host writing to a physical region of disk 122. |
| 530 | 122 | 225 | OX_ID = j RX_ID = u | Disk 122 responds to the second write operation with a message to switch port 225. |
| 532 | 122 | 210 | as in 530 with CS_CTL = 225 | On ingress, external switch port 225 identifies OX_ID = j as associated with intermediate host port 210. Referring to store 360 and/or 334, external switch port 225 relates intermediate host port 204 with an intermediate switch port (e.g. 222). External switch port 225 preserves its identity for process 340 by setting CS_CTL to its own identity (i.e. relative to fabric 232) prior to updating the destination (i.e. setting D_ID = 210) and forwarding it to the intermediate switch port 222. |
| 534 | 122 | 210 | as in 532 | as in 506 |
| 536 | 122 | 210 | as in 534 | as in 508 |
| 538 | 122 | 225 | as in 536 OX_ID = j RX_ID = u except CS_CTL = 0 | On ingress of message 536, process 340 restores the identity of the external switch port (i.e. sets D_ID = 225) based on the CS_CTL field and then clears the CS_CTL field before forwarding message 538 to translate process 338. |
| 544 | 224 | 110 | | Translate process 338 reports completion status and exception status of the region (y, z) and virtual disk 123 to host 110. For example, if the first write operation resulted in an error being reported by physical disk 122 in message 530, service task may take any conventional remedial action or (as shown) may report a suitable error to host 110. Task 338 recognizes the first I_T_L_Q from message 538, and sends message 544 to host 110 via the external switch port associated with it (i.e. S_ID = 224). |
| 546 | 210 | 110 | CA_CTL = 224 OX_ID = v CS_CTL = 224 | On egress, process 340 verifies map 334 and relates the first I_T_L_Q with its exchange (i.e. OX_ID = v) and external switch port 224. Process 340 sets CS_CTL to refer to external switch port 224. Process 340 selects a suitable path to 224, including an intermediate host port (i.e. 210) and an intermediate switch port (i.e. 222) |

TABLE 3-continued

| Message | S_ID | D_ID | Other Field Values | Description |
|---|---|---|---|---|
| 548 | 210 | 110 | as in 546 | as in 517 |
| 550 | 224 | 110 | as in 548 except CS_CTL = 0 | Internal switch port 222 restores the S_ID field based on the CS_CTL, then clears the CS_CTL and forwards the message to the specified external switch port (e.g. 224). |
| 552 | 224 | 110 | as in 550 | External switch port 224 responds to host 110 as a physical disk having the first I_T_L. |

By communicating the identity of a related switch port in another message header field (e.g., as in CS_CTL in message 504), the functions of intermediate host port 210 are made available (e.g., expressed or multiplexed) to any or all external switch ports 206. Where additional message handling capacity is desired, the quantity of intermediate host ports in set 204 may be increased and/or the quantity of external switch ports in set 206 may be increased.

In one embodiment, busy and failing conditions may be automatically addressed by forward process 340 as described above. Reconfiguration may be automatically accomplished by forward process 340. In other embodiments, suitable reconfiguration many be received from a system administrator. For example: if external switch port 224 is busy or is failing, some or all message traffic may be reassigned to use another external switch port (e.g., 226); if intermediate switch port 222 is busy or is failing, some or all message traffic may be reassigned to use any other intermediate switch port (e.g., 223); or if intermediate host port 210 is busy or is failing, some or all message traffic may be reassigned to use any other intermediate host port (e.g., 212). A busy condition may be met by assigning additional functional blocks the same or additional paths. Assigned functional blocks (e.g., 224, 222, and 210) may be associated with a priority for access to resources (e.g., memory, processing, and switching paths). =Through this priority assignment, different paths may provide different performance characteristics.

Figure 11:
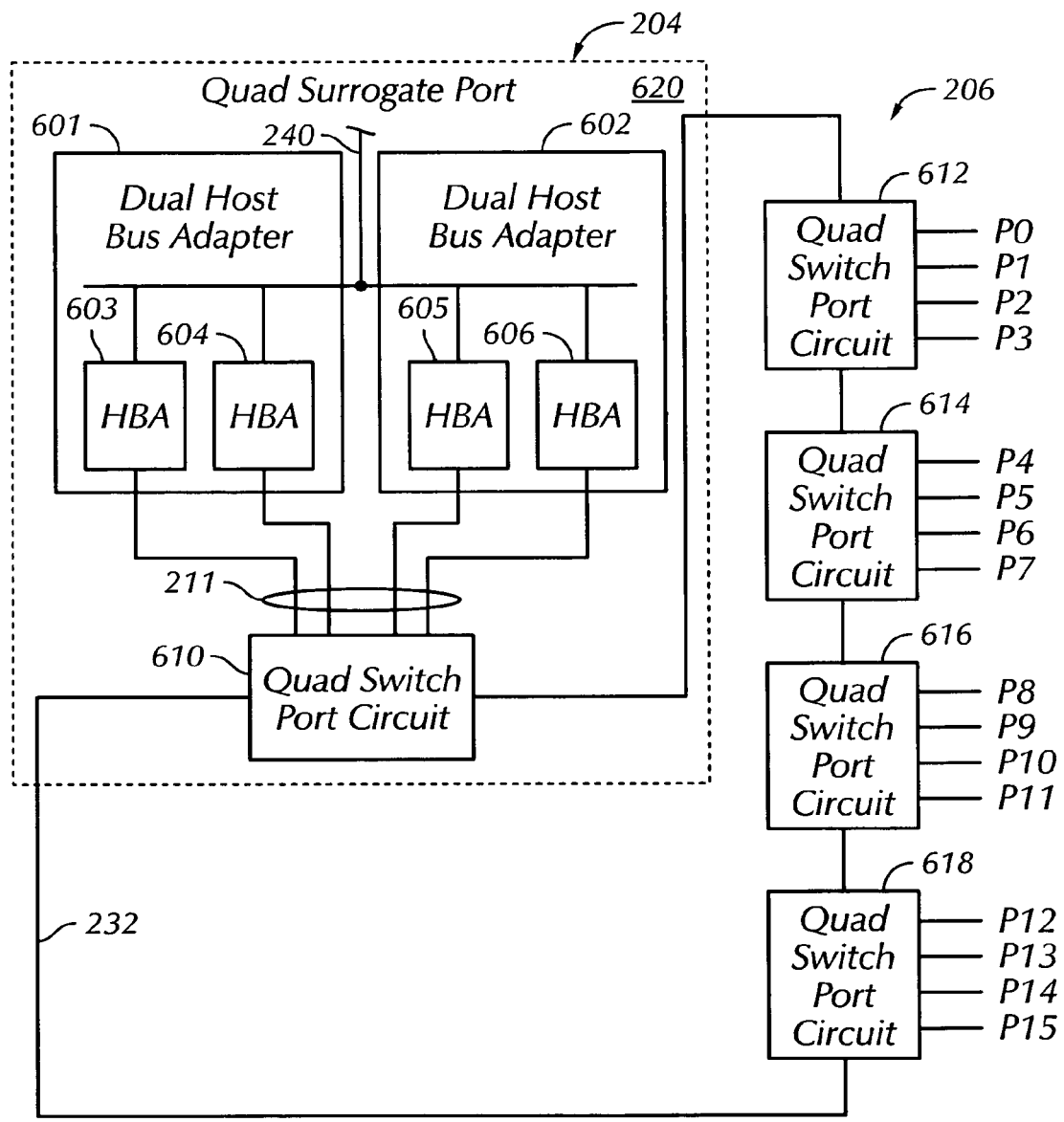
FIG. 11 is a functional block diagram of an implementation of the fabric and ports of the node of FIG. 5.

Circuits used to implement ports and fabric may be integrated and packaged with multiple ports per package. For example, fabric 232 of FIG. 11 couples one quad intermediate switch port 610 to sixteen external switch ports. In this configuration, a total of five quad switch port circuits 610-618 are used, with one providing four intermediate switch ports (i.e. 610). Quad switch port circuits 610-618 are identical except for configuration which may be implemented by hardware (e.g., programmed pins, jumpers), firmware (e.g., settings in nonvolatile memory of the switch port circuit), and/or software (e.g., settings written to control registers in response to switch port control process 332).

Four intermediate host ports are provided by two dual-port host bus adapters 601 and 602 together providing four conventional HBA circuits 603-606. Each HBA 603-606 is coupled to one switch port of quad switch port circuit 610. Each of four switch port circuits of quad switch port circuit 610 provides an independent switch port circuit coupled to a host bus adapter 603-606 to perform as described above with reference to internal switch port 222.

Quad switch port circuits 612-618 provide network connectors identified as P0-P15 for coupling to network 230, to hosts, or to peripherals as discussed above. Each of four switch port circuits of each quad switch port circuit 612-618 provides an independent switch port circuit to perform as described above with reference to external switch port 224-226.

According to various aspects of the present invention, any external switch port of a node may be configured to appear to a network as one or more virtual network ports (e.g. N.NL-ports) or as a switch port (e.g., an F-port). Configuration provides each switch port circuit with information discussed above with reference to a virtual network port table. For example, configuration establishes a unique identifier (relative to the fabric 232) for each switch port coupled to the fabric 232. In addition, each switch port desired to have the capability to forward a message to an intermediate host port is further configured with a designated intermediate switch port identifier (relative to the fabric 232). In one implementation, each relationship in a virtual network port table is implemented by writing the fabric identifier of one intermediate host port (e.g., HBA 604) into a map store 360 and/or 334 that is accessible by each switch port circuit (e.g., first and third circuits of 612) designated to use that intermediate host port. Load balancing among intermediate host ports may be accomplished dynamically by creating or modifying virtual network port table entries in switch port circuits (e.g., quad circuits 612-618). In the same way intermediate host ports may be reserved for particular applications or reserved for use as a hot spare (e.g., fail over).

In one embodiment, the SCSI protocol implemented over Fibre Channel classifies three types of ports by capability: an N-port (including NL-ports), an E-port, and an F-port (including FL-ports). An external switch port as discussed above may be configured initially or suitably during operation as presenting (i.e. to network 230 either one or more N-ports, an F-port, and/or an E-port. An N-port is a source or sink of data communication. A simple link from a host to a peripheral will join a host N-port to a peripheral N-port. An external switch port may expose an F-port on a link to an N-port of either a host or a peripheral. A link between an external switch port and another port on network 230 is supported by an E-port at each end of the link; or by an N-port at the external switch port, and an F-port on the network.

An external switch port of node 200 (e.g., 226) may expose multiple virtual network ports (N-ports) to a network (e.g., 230). When virtual storage is implemented by a node, as discussed above, the node may appear to a host to have implemented a virtual network port to the virtual storage. A service task (i.e. at the ST-1, 2, 3, or 4 layers) may be a source or sink of data communication by operating on one or more virtual network ports supported by network node 200. Consequently, an external switch port coupled to an intermediate host port exposes an N-port for service tasks running on processors 251/252.

When several intermediate host ports are available, each may have a transport address which may then be associated with any number of virtual network ports (each having a transport address) including many-to-many associations for throughput and load balancing. For example, in Fibre Channel, this means that the N_port address of an intermediate host port may be associated with one or more N_port addresses (i.e. of its associated virtual network port or ports).

As discussed above, the identity of the external switch port that received a message is not lost as the message proceeds toward a service task (i.e. at layers ST-3, 4) The service task typically has access to the identity (e.g., address) of the virtual network port and not the identity (e.g., address) of the intermediate switch port. Generally, the destination address of a message from a host to a service task is the address a virtual network port accessible on a particular external switch port. The message is revised to indicate the destination of the intermediate host port while en route between the external switch port and the intermediate host port. The message may then be restored to its original destination address value before being presented to a service task being executed by processors 251-252.

The architecture discussed above permits a conventional snapshot operation wherein the portion of the secondary volume where the snapshot (of a primary volume) is stored may be halted (denying reads and writes until the snapshot is completed) for the duration of the snapshot operation.

Associations stored in any of switch port integral memory, memory 258 and memory 253 may include an association of an intermediate host port 210 and an external switch port (e.g., 226). An intermediate host port 210 may implement virtual network ports (virtual N-ports) on one or more external switch ports. Communication between the intermediate switch port(s) and external switch port(s) provides services at each virtual network port.

Service tasks may read and modify any portion of a message. For example, a mirroring service may be implemented by one or more service tasks (ST-1, ST-2, ST-3, and/or ST-4) by parsing incoming message CDB fields for LBA and block length. For example, the incoming message may specify a virtual LBA which is also subject to mirroring. As a result, modified and additional messages may be created by a service task that include completely different destination addresses, LBA values, and block length values.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A method of processing messages in network, comprising:
   receiving a message via a network;
   accessing mapping information stored in a memory, the mapping information comprising control data for processing the message;
   determining if the message is to be processed by a first device coupled to memory and the network, based at least in part on the control data;
   if so, processing the message with the first device;
   otherwise, forwarding the message to a second device for processing; wherein the first device comprises a switch port and the second device comprises a processor, and the switch port forwards the message to the processor via a host bus adaptor; and
   changing temporarily a destination address of the message to correspond to an address associated with the host bus adaptor while saving the original destination address in a control field contained in the message.

2. The method of claim 1 wherein the message comprises at least one frame of data, the at least one frame of data comprising a header portion and a payload portion, the header portion containing header data used to process the message.

3. The method of claim 2 wherein the header data comprises a source identifier indicating an identity of a first network entity as the source of the message and a destination identifier indicating the identity of a second network entity as the intended destination of the message.

4. The method of claim 3 wherein the header data further comprises a logical unit number.

5. The method of claim 4 wherein the header data further comprises a logical address range associated with the second network entity.

6. The method of claim 4 wherein a logical address range associated with the second network entity is implied, wholly or in part, by processing of previous messages, with header data contained in the current message providing any additional necessary logical address information.

7. The method of claim 3 wherein the second network entity is a virtual entity.

8. The method of claim 1 wherein the mapping information comprises information correlating a virtual network entities to physical network entities and the step of processing the message comprises accessing the mapping information to identify at least one physical network entity corresponding to a virtual entity for which the message is intended, and routing the message to the at least one physical entity.

9. The method of claim 8 wherein, if the mapping information is insufficient to identify at least one physical network entity corresponding to the virtual entity, the message is forwarded to the second device.

10. The method of claim 9 wherein the second device updates the mapping information to correlate at least one physical device with the virtual entity.

11. The method of claim 1 wherein the first and second devices are both coupled to the memory and capable of accessing the mapping information stored therein.

12. The method of claim 1 wherein the message comprises a SCSI protocol message.

13. The method of claim 1 wherein the message is transmitted in accordance with a Fibre Channel Network protocol.

14. The method of claim 1 wherein the message is transmitted in accordance with a TCP/IP protocol.

15. A method of processing a message, comprising:
    receiving the message by a switch port;
    parsing the message to extract a routing data, the routing data comprising a network address of an initiating device, a network address of a virtual target port and a logical unit number of a virtual peripheral;
    accessing mapping information stored in a memory to determine if the message can be processed by the switch port;
    if it is determined that the switch port cannot process the message, then reformatting the routing data to provide an address for an intermediate host port as an intermediate destination address;
    forwarding the message to the intermediate host port;
    reformatting the routing data a second time to indicate an address corresponding to the virtual target port as the final destination address; and
    forwarding the message to a processor for processing.

16. The method of claim 15 wherein:
    the first reformatting step comprises storing the address corresponding to the virtual target port in a CS_CTL field contained in the message and assigning the address of the intermediate host port as the temporary destination address; and after the message has been forwarded to the intermediate host port, the second reformatting step comprises re-assigning the virtual target port address as the final destination address and clearing the CS_CTL field.

17. The method of claim 15 further comprising identifying a physical port corresponding to the virtual target port address and forwarding the message to the physical port for transmission to at least one physical network entity via the network.

18. The method of claim 17 wherein the physical port corresponds to a plurality of virtual port addresses and the mapping table correlates the physical port with the plurality of virtual port addresses.

19. A network node for processing messages transmitted via a network, comprising:
 a first circuit providing a processor-based node path;
 a second circuit, coupled to the first circuit, providing a switch-based node path; and a memory storing mapping information accessible by the first and second circuits,
 wherein the processing of messages received by the network node is allocated between the first and second circuit based on the mapping information; and
 the mapping information comprises the identity of remote ports, registered peripherals, virtual network ports, page tables, segment tables, connection flows, virtual peripheral flows and exchange flows.

20. The network node of claim 19 wherein the memory comprises a first memory storing a first subset of the mapping information and a second memory storing a second subset of the information, wherein the second circuit has faster access to the second memory than to the first memory.

21. The network node of claim 20 wherein the first memory comprises a random access memory (RAM) and the second memory comprises a content addressable memory (CAM).

22. A system for processing messages in network, comprising:
 means for receiving a message via a network;
 means for accessing mapping information stored in a memory, the mapping information comprising control data for processing the message;
 means for determining if the message is to be processed by a first processing means, coupled to memory and the network, based at least in part on the control data;
 first processing means for processing the message if it is determined the message is to be processed by the first processing means;
 means for forwarding the message to a second processing means for processing; and
 means for changing temporarily a destination address of the message to correspond to an address associated with the host bus adaptor while saving the original destination address in a control field contained in the message.

23. The system of claim 22 wherein the mapping information comprises information correlating a virtual network entities to physical network entities and the means for processing the message comprises means for accessing the mapping information to identify at least one physical network entity corresponding to a virtual entity for which the message is intended, and means for routing the message to the at least one physical entity.

24. A system for processing a message, comprising:
 means for receiving the message by a switch port;
 means for parsing the message to extract a routing data, the routing data comprising a network address of an initiating device, a network address of a virtual target port and a logical unit number of a virtual peripheral;
 means for accessing mapping information stored in a memory to determine if the message can be processed by the switch port;
 first means for reformatting the routing data to provide an address for an intermediate host port as an intermediate destination address if it is determined that the switch port cannot process the message;
 means for forwarding the message to the intermediate host port;
 second means for reformatting the routing data a second time to indicate an address corresponding to the virtual target port as the final destination address; and
 means for forwarding the message to a processor for processing.

25. The network node of claim 19 wherein the first circuit comprises at least one processor; and the second circuit comprises a plurality of switch ports coupled to each other via a fabric, the plurality of switch ports each coupled to the network.

26. The network node of claim 25 further comprising an intermediate host port coupled to the at least one processor and the plurality of switch ports so as to provide a communication path between the at least one processor and the plurality of switch ports.

27. The network node of claim 26 wherein the intermediate host port comprises a host bus adapter.

28. The network node of claim 26 wherein the first circuit is located remotely from the second circuit and the intermediate host port is coupled to said plurality of switch ports via a network.

* * * * *

UNITED STATES PATENT AND TRADEMARK OFFICE
CERTIFICATE OF CORRECTION

PATENT NO. : 7,447,197 B2  Page 1 of 1
APPLICATION NO. : 11/098831
DATED : November 4, 2008
INVENTOR(S) : William Clinton Terrell et al.

It is certified that error appears in the above-identified patent and that said Letters Patent is hereby corrected as shown below:

In column 8, line 63, delete "242" and insert -- 242, --, therefor.

In column 8, line 64, delete "242" and insert -- 242, --, therefor.

In column 9, line 64, delete "242" and insert -- 242, --, therefor.

In column 10, line 15, delete "242" and insert -- 242, --, therefor.

In column 10, line 19, delete "242" and insert -- 242, --, therefor.

In column 12, line 27, delete "242" and insert -- 242, --, therefor.

In column 13, line 24, delete "242" and insert -- 242, --, therefor.

Signed and Sealed this

Fifth Day of October, 2010

David J. Kappos
*Director of the United States Patent and Trademark Office*